(12) United States Patent
Zhang et al.

(10) Patent No.: US 11,223,973 B2
(45) Date of Patent: *Jan. 11, 2022

(54) WIRELESS LOCAL AREA NETWORK DATA TRANSMISSION METHOD AND APPARATUS

(71) Applicant: Huawei Technologies Co., Ltd., Shenzhen (CN)

(72) Inventors: Jiayin Zhang, Shanghai (CN); Jun Luo, Kista (SE); Phillip Barber, McKinney, TX (US)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/002,495

(22) Filed: Aug. 25, 2020

(65) Prior Publication Data

US 2020/0389814 A1 Dec. 10, 2020

Related U.S. Application Data

(63) Continuation of application No. 15/463,796, filed on Mar. 20, 2017, now Pat. No. 10,893,438, which is a (Continued)

(30) Foreign Application Priority Data

Sep. 19, 2014 (WO) ................ PCT/CN2014/086944
Jan. 6, 2015 (WO) ................ PCT/CN2015/070233

(51) Int. Cl.
*H04W 28/06* (2009.01)
*H04W 52/02* (2009.01)
(Continued)

(52) U.S. Cl.
CPC .............. *H04W 28/06* (2013.01); *H04B 7/26* (2013.01); *H04L 27/2602* (2013.01);
(Continued)

(58) Field of Classification Search
CPC ..... H04W 28/06; H04W 52/02; H04W 84/12; H04B 7/26; H04L 27/2602; H04L 69/22; Y02D 30/70
See application file for complete search history.

(56) References Cited

U.S. PATENT DOCUMENTS

2005/0105504 A1* 5/2005 Sakoda ................ H04L 1/0072
370/349
2005/0226273 A1 10/2005 Qian
(Continued)

FOREIGN PATENT DOCUMENTS

CA 2856040 A1 5/2013
CN 101714896 A 5/2010
(Continued)

OTHER PUBLICATIONS

"IEEE Standard for Information technology—Telecommunications and information exchange between systems Local and metropolitan area networks—Specific requirements; Part 11: Wireless LAN Medium Access Control (MAC) and Physical Layer (PHY) Specifications," IEEE Computer Society, IEEE Std 802.11-2012, Institute of Electrical and Electronics Engineers, New York, New York (Mar. 29, 2012).
(Continued)

Primary Examiner — Harry H Kim
(74) Attorney, Agent, or Firm — Leydig, Voit & Mayer, Ltd.

(57) ABSTRACT

Embodiments of the present invention discloses a wireless local area network data transmission method and apparatus, which are used for improving data transmission efficiency. The method includes: generating, by an access point (AP), a physical layer protocol data unit (PPDU) of a wireless local area network, wherein the PPDU comprises a Physical Layer Convergence Protocol (PLCP) header domain and a data domain, wherein the PLCP header domain comprises a
(Continued)

preamble and a control domain, and the control domain carries duration information, wherein the duration information is used for network allocation vector (NAV) setting and protecting transmission of subsequent one or more PPDUs after the generated PPDU in a transmission opportunity (TXOP), and a duration indicated by the duration information includes transmission time of the subsequent one or more PPDUs after the generated PPDU in the TXOP; and sending, by the AP, the generated PPDU.

20 Claims, 11 Drawing Sheets

Related U.S. Application Data continuation of application No. PCT/CN2015/070288, filed on Jan. 7, 2015.

(51) Int. Cl.
  H04B 7/26       (2006.01)
  H04L 27/26      (2006.01)
  H04L 29/06      (2006.01)
  H04W 84/12      (2009.01)

(52) U.S. Cl.
  CPC ............ *H04L 69/22* (2013.01); *H04W 52/02* (2013.01); *H04W 84/12* (2013.01); *Y02D 30/70* (2020.08)

(56) References Cited

U.S. PATENT DOCUMENTS

| | | | |
|---|---|---|---|
| 2005/0262217 A1 | 11/2005 | Nonaka et al. | |
| 2007/0171902 A1 | 7/2007 | Simonsson et al. | |
| 2007/0237169 A1* | 10/2007 | Trainin | H04L 12/66 370/458 |
| 2007/0242621 A1* | 10/2007 | Nandagopalan | H04L 12/413 370/254 |
| 2008/0232335 A1 | 9/2008 | Del Prado Pavon et al. | |
| 2011/0038332 A1* | 2/2011 | Liu | H04W 72/1263 370/329 |
| 2012/0044904 A1* | 2/2012 | Takano | H04L 27/2602 370/329 |
| 2012/0051312 A1 | 3/2012 | Noh et al. | |
| 2012/0051342 A1 | 3/2012 | Liu et al. | |
| 2012/0170565 A1* | 7/2012 | Seok | H04L 5/0046 370/338 |
| 2012/0314636 A1 | 12/2012 | Liu | |
| 2012/0314653 A1 | 12/2012 | Liu | |
| 2012/0327862 A1* | 12/2012 | Lee | H04W 72/042 370/328 |
| 2013/0128808 A1 | 5/2013 | Wentink et al. | |
| 2013/0208607 A1 | 8/2013 | Abraham et al. | |
| 2013/0215836 A1 | 8/2013 | Quan et al. | |
| 2014/0036895 A1 | 2/2014 | Liu et al. | |
| 2014/0071873 A1* | 3/2014 | Wang | H04W 72/0446 370/311 |
| 2014/0307726 A1 | 10/2014 | Kang et al. | |
| 2014/0321349 A1* | 10/2014 | Seok | H04W 52/0216 370/311 |
| 2015/0003367 A1 | 1/2015 | Seok | |
| 2015/0124680 A1 | 5/2015 | Kang et al. | |
| 2015/0181620 A1 | 6/2015 | Seok | |
| 2015/0289164 A1* | 10/2015 | Seok | H04L 61/6022 370/311 |
| 2015/0312940 A1 | 10/2015 | Xing et al. | |
| 2015/0327120 A1 | 11/2015 | Liu et al. | |
| 2015/0358897 A1 | 12/2015 | Park et al. | |
| 2016/0330708 A1 | 11/2016 | Seok | |
| 2017/0048899 A1* | 2/2017 | Li | H04L 1/0072 |
| 2017/0105143 A1* | 4/2017 | Seok | H04W 74/0808 |
| 2017/0164409 A1* | 6/2017 | Kim | H04W 74/0825 |
| 2017/0208542 A1* | 7/2017 | Kim | H04W 52/02 |
| 2017/0245306 A1* | 8/2017 | Kim | H04L 69/324 |
| 2017/0273023 A1 | 9/2017 | Seok et al. | |

FOREIGN PATENT DOCUMENTS

| | | |
|---|---|---|
| CN | 102550089 A | 7/2012 |
| CN | 102652418 A | 8/2012 |
| CN | 103037531 A | 4/2013 |
| CN | 103718596 A | 4/2014 |
| CN | 103765848 A | 4/2014 |
| CN | 103916178 A | 7/2014 |
| CN | 103947263 A | 7/2014 |
| EP | 1762020 B1 | 10/2009 |
| EP | 2369894 A1 | 9/2011 |
| EP | 2451237 A2 | 5/2012 |
| JP | 2006197032 A | 7/2006 |
| JP | 2007533173 A | 11/2007 |
| JP | 2007533175 A | 11/2007 |
| JP | 2010109939 A | 5/2010 |
| JP | 2011172283 A | 9/2011 |
| JP | 2013523005 A | 6/2013 |
| JP | 2014520426 A | 8/2014 |
| JP | 2014522610 A | 9/2014 |
| KR | 20130005289 A | 1/2013 |
| WO | 2011115408 A2 | 9/2011 |
| WO | 2013115629 A1 | 8/2013 |
| WO | 2013119095 A1 | 8/2013 |
| WO | 2013147567 A1 | 10/2013 |
| WO | 2013170136 A1 | 11/2013 |
| WO | 2013191439 A1 | 12/2013 |
| WO | 2014042596 A1 | 3/2014 |
| WO | 2014058192 A1 | 4/2014 |
| WO | 2014109591 A1 | 7/2014 |

OTHER PUBLICATIONS

"IEEE Standard for Information Technology—Telecommunications and information exchange between systems Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6 GHz," IEEE Computer Society, IEEE Std 802.11 ac-2013, Institute of Electrical and Electronics Engineers, New York, New York (2013).

"IEEE Standard for Information technology—Telecommunications and information exchange between systems—Local and metropolitan area networks-Specific requirements; Part 11: Wireless LAN Medium Access Control (MAC) and Physical Layer (PHY) Specifications; Amendment 5: Enhancements for Higher Throughput," IEEE Computer Society, EEE Std 802.11 n-2009, Institute of Electrical and Electronics Engineers, New York, New York (Oct. 29, 2009).

"Information-technology—Open Systems Interconnection—Basic Reference Model: The Basic Model," ISO/IEC 7498-1, International Standard, Switzerland (1994).

U.S. Appl. No. 15/463,796, filed Mar. 20, 2017.

\* cited by examiner

WIRELESS LOCAL AREA NETWORK DATA TRANSMISSION METHOD AND APPARATUS

CROSS-REFERENCE TO RELATED APPLICATIONS

This application is a continuation of U.S. patent application Ser. No. 15/463,796, filed on Mar. 20, 2017, which is a continuation of International Application No. PCT/CN2015/070288, filed on Jan. 7, 2015, which claims priority to International Application No. PCT/CN2014/086944, filed on Sep. 19, 2014 and claims priority to Application No. PCT/CN2015/070233, filed on Jan. 6, 2015. All of the afore-mentioned patent applications are hereby incorporated by reference in their entireties.

TECHNICAL FIELD

The embodiments of the present invention relates to the field of wireless communication, and in particular, to a wireless local area network data transmission method and apparatus.

BACKGROUND

With rapid development of communications technologies, a wireless local area network (WLAN) technology based on an IEEE 802.11 standard is widely used. A physical layer (PHY) based on an IEEE 802.11n/ac protocol uses an orthogonal frequency division multiplexing (OFDM) technology.

A WLAN network may include multiple access points (AP) and multiple stations (STA). Each AP may be associated with multiple STAs, and each AP may transmit, by using a radio channel, wireless local area network data with a STA associated with the AP. An AP transmits a physical layer protocol data unit (PPDU) with a STA associated with the AP.

In the prior art, a receive end STA can determine whether information on a PPDU belongs to the STA only after parsing the entire PPDU. Consequently, a large amount of unnecessary information is parsed during the process, thereby reducing transmission efficiency. Therefore, based on an IEEE 802.11ax protocol, a wireless local area network data transmission manner is urgently needed to improve data transmission efficiency.

SUMMARY

Embodiments of the present invention provide a wireless local area network data transmission method and apparatus, which are used for improving data transmission efficiency.

According to a first aspect, a wireless local area network communications apparatus is provided, where the communications apparatus is disposed in an access point (AP), and includes:
  a processing unit, configured to generate a physical layer protocol data unit (PPDU) of a wireless local area network, where the PPDU includes at least a Physical Layer Convergence Protocol (PLCP) header domain and a data domain, where the PLCP header domain includes a preamble and a control domain, and the control domain carries at least an identifier of the AP, an identifier of at least one station (STA), and duration information; and
  a transceiver unit, configured to send the generated PPDU.

According to a second aspect, a wireless local area network communications apparatus is provided, where the communications apparatus is disposed in a station (STA), and includes:
  a transceiver unit, configured to receive a physical layer protocol data unit (PPDU) of a wireless local area network sent by an access point AP, where the PPDU includes at least a Physical Layer Convergence Protocol (PLCP) header domain and a data domain, where the PLCP header domain includes a preamble and a control domain, and the control domain carries at least identifier information of the AP, an identifier of at least one station (STA), and duration information; and
  a processing unit, configured to obtain, by means of parsing, the identifier information of the AP, the identifier of at least one station (STA), and the duration information in the control domain of the PPDU.

According to a third aspect, a wireless local area network communications apparatus is provided, where the communications apparatus is disposed in an access point AP, and includes:
  a processor, configured to generate a physical layer protocol data unit (PPDU) of a wireless local area network, where the PPDU includes at least a Physical Layer Convergence Protocol (PLCP) header domain and a data domain, where the PLCP header domain includes a preamble and a control domain, and the control domain carries at least an identifier of the AP, an identifier of at least one station (STA), and duration information;
  a transceiver, configured to send the generated PPDU; and
  a memory, configured to store an MPDU and the PPDU, where the memory may also store code used by the processor to execute the foregoing process.

According to a fourth aspect, a wireless local area network communications apparatus is provided, where the communications apparatus is disposed in a station (STA), and includes:
  a transceiver, configured to receive a physical layer protocol data unit (PPDU) of a wireless local area network sent by an access point (AP), where the PPDU includes at least a Physical Layer Convergence Protocol (PLCP) header domain and a data domain, where the PLCP header domain includes a preamble and a control domain, and the control domain carries at least identifier information of the AP, an identifier of at least one station (STA), and duration information; and
  a processor, configured to obtain, by means of parsing, the identifier information of the AP, the identifier of at least one station (STA), and the duration information in the control domain of the (PPDU).

According to a fifth aspect, an access point is provided, including the communications apparatus according to any one of claims 1 to 8, and further including:
  a radio frequency module, configured to receive a PPDU sent by a transceiver unit, modulate the PPDU into a radio frequency signal, and then send the radio frequency signal.

According to a sixth aspect, a station (STA) is provided, where the STA includes the communications apparatus according to any one of claims 10 to 15, and further includes:
  a radio frequency module, configured to receive a radio frequency signal of a PPDU sent by an AP, demodulate the radio frequency signal into a PPDU, and then send the PPDU to a transceiver unit.

According to an eighth aspect, a wireless local area network data transmission method is provided, including:

receiving a physical layer protocol data unit (PPDU) of a wireless local area network sent by an access point (AP), where the PPDU includes at least a Physical Layer Convergence Protocol (PLCP) header domain and a data domain, where the PLCP header domain includes a preamble and a control domain, and the control domain carries at least identifier information of the AP, an identifier of at least one station (STA), and duration information; and obtaining, by means of parsing, the identifier information of the AP, the identifier of at least one station (STA), and the duration information in the control domain of the PPDU.

In the embodiments of the present invention, a control domain of a PLCP header domain in a PPDU constructed by an AP carries identifier information of the AP, duration information, and an identifier of at least one STA, so that a STA may obtain the identifier information of the AP, the duration information, and the identifier of at least one STA by parsing only the control domain of the PLCP header domain. Therefore, the STA may determine whether the control domain of the PPDU includes an identifier of the STA and a wildcard STA identifier according to an identifier of the AP and the identifier of at least one STA; and further, if the STA determines that the control domain of the PPDU does not include the identifier of the STA or the wildcard STA identifier, the STA configures an NAV according to the duration information. In this process, only the control domain of the PPDU is parsed, thereby improving data transmission efficiency.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

In embodiments of the present invention, a control domain of a PLCP header domain in a PPDU constructed by an AP carries identifier information of the AP, duration information, and an identifier of at least one STA, so that a STA may obtain the identifier information of the AP, the duration information, and the identifier of at least one STA by parsing only the control domain of the PLCP header domain. Therefore, the STA may determine whether the control domain of the PPDU includes an identifier of the STA and a wildcard STA identifier according to an identifier of the AP and the identifier of at least one STA; and further, if the STA determines that the control domain of the PPDU does not include the identifier of the STA or the wildcard STA identifier, the STA configures an NAV according to the duration information. In this process, only the control domain of the PPDU is parsed, thereby improving data transmission efficiency.

A standard for a next generation wireless local area network that is currently being formulated is IEEE 802.11ax, which intends to improve efficiency of a wireless local area network in a practical network deployment scenario, and is therefore referred to as a high-efficiency wireless local area network (WLAN, HEW). A PHY based on the IEEE 802.11ax uses an Orthogonal Frequency Division Multiple Access (OFDMA) technology.

Figure 1:
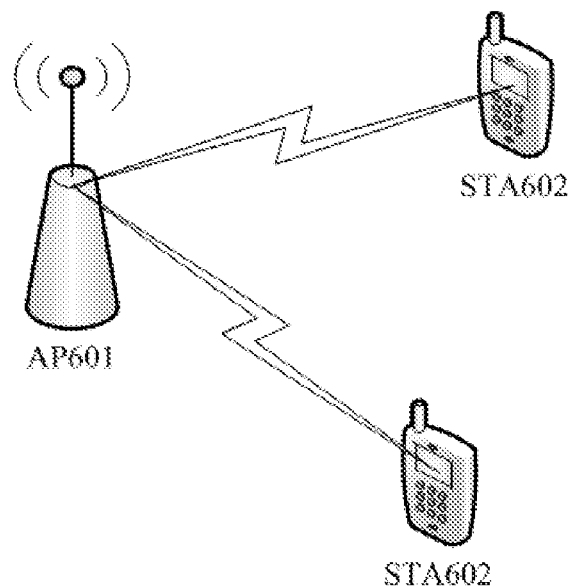
FIG. 1 shows a data transmission system according to an embodiment of the present invention.

A WLAN may include multiple access points (AP) and multiple stations (STA). Each AP may be associated with multiple STAs, and each AP may transmit, by using a radio channel, wireless local area network data with a STA associated with the AP. The embodiments of the present invention are applied to a WLAN system, and the WLAN system includes an AP and a STA. FIG. 1 is a simple schematic diagram of a WLAN system applied to an embodiment of the present invention. The system in FIG. 1 includes one or more AP601s and one or more STA602s.

Wireless communication between the AP601 and the STA602 is performed by using an OFDMA technology.

An AP may also be referred to as a wireless access point, a bridge, a hotspot, or the like, and may access a server or a communications network.

A STA may also be referred to as a user, or may be a wireless sensor, a wireless communications terminal, or a mobile terminal, for example, a mobile phone (or referred to as a "cellular" phone) supporting a Wi-Fi communication function or a computer with a wireless communication function. For example, the STA may be a portable, pocket-sized, handheld, computer built-in, wearable, or in-vehicle wireless communications apparatus that supports the Wi-Fi communication function and exchanges communications data, such as voice or data, with a radio access network.

Identifier information of the AP mentioned in this embodiment of the present invention is used to uniquely identify the AP within a network coverage area. The identifier information of the AP may be a basic service set identifier (BSSID), or a part of the BSSID, for example, 7 lowest bits in the BSSID, an identifier generated based on the BSSID, or an identifier of the AP pre-allocated by a network.

Duration information mentioned in this embodiment of the present invention is used by the STA to configure an NAV of the STA by using the data, and the duration information may be indicated by using 15 bits.

Figure 2:
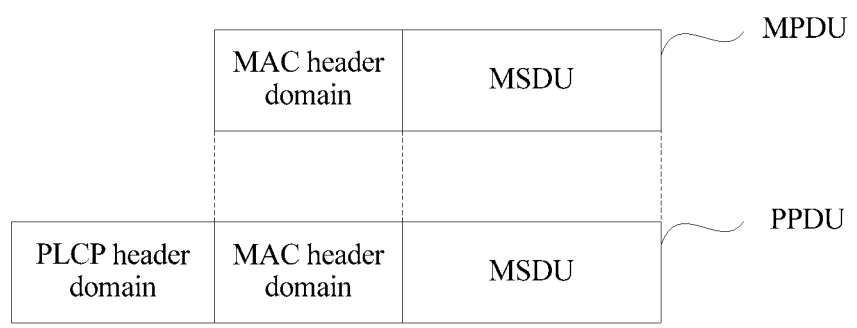
FIG. 2 is a schematic structural diagram of an MPDU and a PPDU in the prior art.
Figure 3:
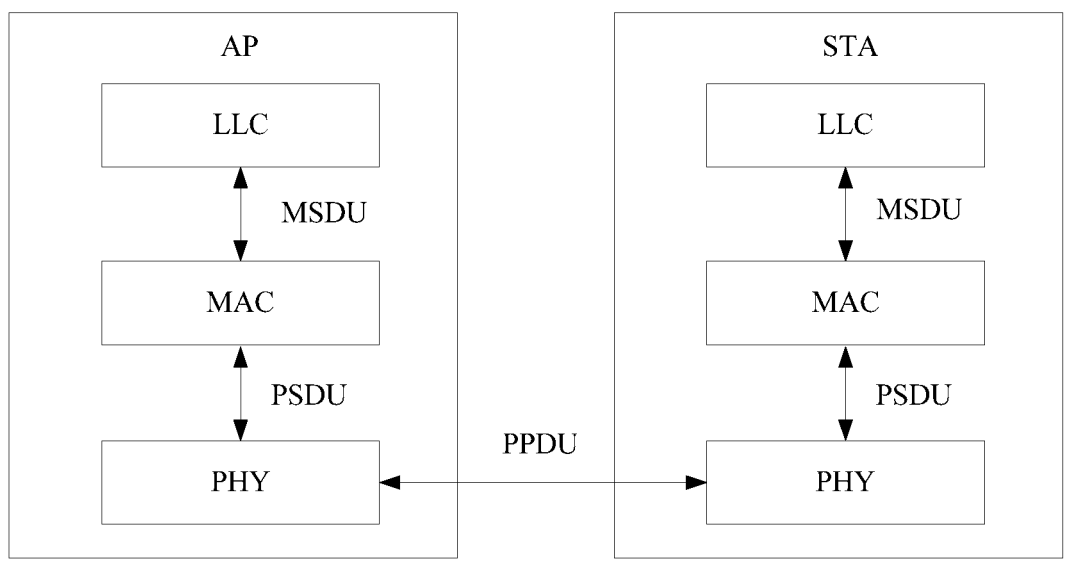
FIG. 3 is a schematic diagram of an architecture for data transmission between an AP and a STA in the prior art.

FIG. 2 exemplarily shows a structural diagram of an MPDU and a PPDU in the prior art. FIG. 3 exemplarily shows a diagram of an architecture for data transmission between an AP and a STA in the prior art. As shown in FIG. 2 and FIG. 3, when an AP performs data transmission with a STA associated with the AP, the AP generally encapsulates an MSDU as a Medium Access Control protocol data unit (MPDU) by attaching a Medium Access Control (MAC) header domain to the Medium Access Control service data unit (MSDU) at an upper-layer logical link control layer (LLC); the AP encapsulates the MPDU as a physical layer protocol data unit (PPDU) by attaching a protocol processing unit (PLCP) header domain to the MPDU. The AP transmits the PPDU with a STA associated with the AP.

Figure 4:
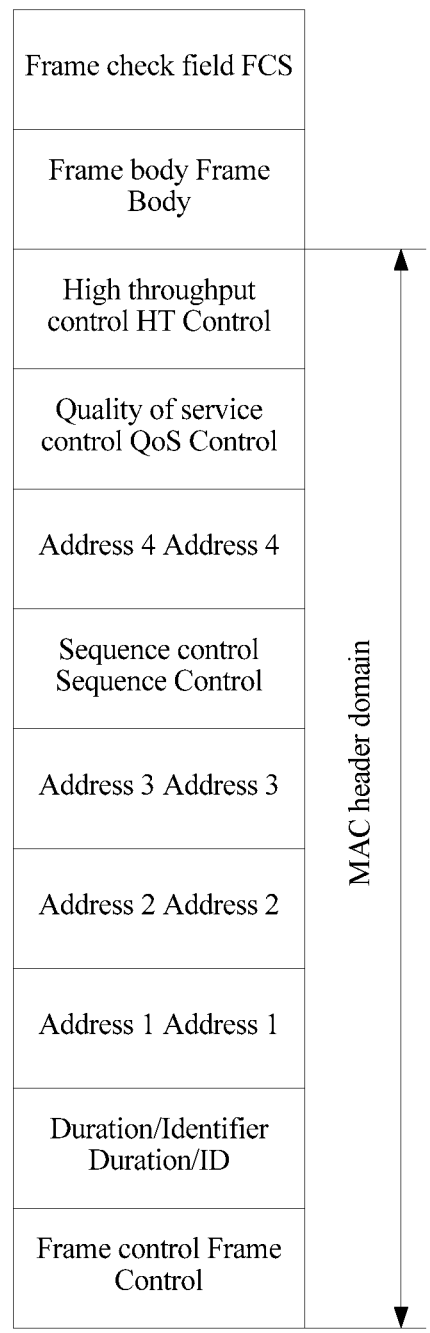
FIG. 4 is a schematic diagram of a frame structure of an MPDU in the prior art.

FIG. 4 is a simple schematic diagram of a format of an MPDU in the prior art. As shown in FIG. 4, frame control, duration/identifier (Duration/ID), an address 1, and a last frame check sequence (FCS) field are included in each MPDU. An address 2, an address 3, sequence control, an address 4, quality of service (QoS) control, high-throughput (HT) control, and a frame body are included in a specific frame.

The frame control field is used to indicate a type of a PPDU.

A duration message is used by a STA to configure an NAV of the STA, so as to ensure that no data is sent during a time length of the duration message, thereby reducing channel interference.

The address 1 is a receiver address (RA) of the MPDU, and the address 2 is a transmitter address (TA) of the MPDU. When data is downlink data sent by an AP to a STA, the address 1 is a MAC address of the receive end STA, and the address 2 is a MAC address of the transmit end AP; or when data is uplink data sent by a STA to an AP, the address 1 is a MAC address of the receive end AP, and the address 2 is a MAC address of the transmit end STA.

Figure 5:
FIG. 5 is a schematic diagram of a frame structure of a PPDU in the prior art.

FIG. 5 shows a format of an OFDM PPDU in the prior art. As shown in the figure, three sections of signals in the first 20 μs include an 8 μs legacy short training field (L-STF), an 8 μs legacy long training field (L-LTF), and a 4 us legacy signal field (L-SIG). The L-STF is used to synchronize a STA associated with an AP to the AP, and the L-LTF is used by the STA associated with the AP to perform channel estimation, so as to obtain, by using coherent reception, information about duration of a radio frame carried in the L-SIG A very high throughput signal domain A (VHT-SIG-A) carries transmission configuration parameter information of the PPDU. A very high throughput short training field (VHT-STF) is used by a receive end to perform automatic gain control (AGC). A very high throughput long training field (VHT-LTF) is used by the receive end to perform channel estimation and coherent detection. A very high throughput signal domain B (VHT-SIG-B) is used to indicate a modulation and coding scheme (MCS) used by subsequent data, and a length of the MPDU transmitted. The last data domain is used to carry the MPDU.

In the foregoing FIG. 4 and FIG. 5, the MPDU is carried in the data domain in the last part of the PPDU. A duration message and a receiver address (address 1) or a transmitter address (address 2) are carried in a MAC header domain of the MPDU. When the duration message and the receiver address (address 1) are parsed out by a receive end, if the receiver address is not a MAC address or a group address (group address) corresponding to the receive end, the receive end configures, according to the duration information, a network allocation vector (NAV) of a STA corresponding to the receive end, so as to ensure that no data is sent within a time length of the duration message, thereby reducing channel interference.

Figure 6:
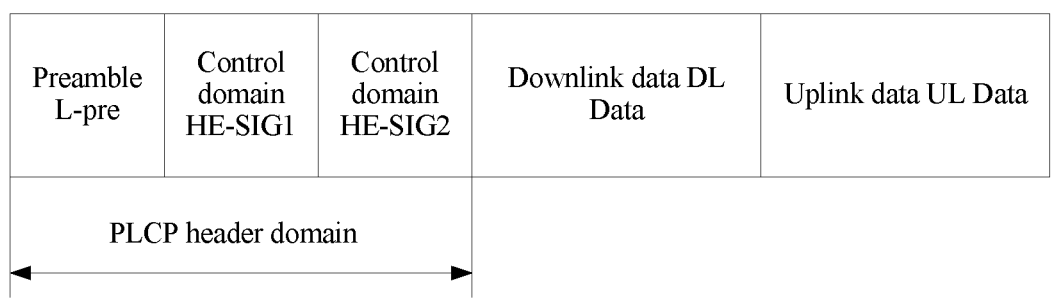
FIG. 6 is a schematic diagram of a frame structure of a PPDU applied to an embodiment of the present invention.

FIG. 6 is a simple schematic diagram of a format of a PPDU applied to an embodiment of the present invention. As shown in FIG. 6, the PPDU includes a PLCP header domain and a data domain. The PLCP header domain includes a legacy preamble (L-Pre for short) and a control domain, where the control domain includes a high efficiency signal domain (HE-SIG) 1 and an HE-SIG 2, and the data domain includes a downlink (DL for short) data domain and/or an uplink (UL) data domain.

The L-Pre uses a preamble part that is compatible with the IEEE 802.11, where the existing IEEE 802.11 may be an IEEE 802.11a, an IEEE 802.11g, an IEEE 802.11n, an IEEE 802.11ac, or an IEEE 802.11ax. The L-Pre part includes an L-STF, an L-LTF, and an L-SIG where functions of the L-STF, the L-LTF, and the L-SIG are the same as those of corresponding fields in the OFDM PPDU in the prior art in FIG. 5.

Data in the HE-SIG 1 in the control domain is used to indicate format configuration of a frame that closely follows the HE-SIG 1 of a STA that performs transmission based on the IEEE 802.11ax protocol, for example, a transmission manner of the HE-SIG 2, or a quantity or an arrangement order of uplink and downlink data domains. The HE-SIG 1 in the control domain may be parsed by all STAs that perform transmission based on the IEEE 802.11ax protocol.

The HE-SIG 2 in the control domain includes resource indication information configured for the STA, where the resource indication information includes at least one STA identifier, the STA identifier may be an identifier of a STA associated with an AP address in the PPDU, or a wildcard STA identifier, where the wildcard STA identifier includes identifiers of a group of STAs or all the STAs. The resource indication information configured for the STA includes: public control information that is not included in the HE-SIG 1, allocation information of uplink and downlink OFDMA time-frequency resource blocks, a MAC address of the scheduled STA or identifier information of a STA associated with an MAC address of the STA, transmission signaling corresponding to the scheduled STA, and some other optional transmission parameter configuration information, such as an MCS, or a quantity of spatial flows.

A difference from the prior art is: The control domain of a PPDU structure in this embodiment of the present invention further includes an identifier of an AP, an identifier of at least one STA, and duration information, where the identifier of the AP and the duration information may be put in the HE-SIG 1 or the HE-SIG 2 of the control domain, and the identifier of the STA is located in resource indication information of the HE-SIG 2. In this way, the STA may obtain identifier information of the AP, the duration information, the identifier of at least one STA by parsing only the control domain of the PLCP header domain. Therefore, the STA may determine whether the control domain of the PPDU includes an identifier of the STA and a wildcard STA identifier according to an identifier of the AP and the identifier of at least one STA; and further, if the STA determines that the control domain of the PPDU does not include the identifier of the STA or the wildcard STA identifier, the STA configures an NAV according to the duration information. In this process, only the control domain of the PPDU is parsed, thereby improving data transmission efficiency.

The data domain may include an UL data domain and a DL data domain, and both the UL data domain and the DL data domain are used to carry an MPDU.

A frame structure of a downlink MPDU carried on the data domain of the PPDU provided in this embodiment of the present invention is shown in FIG. 13a to FIG. 13e. A difference from the prior art is: A MAC header domain of the MPDU carried on the data domain of the PPDU in this embodiment of the present invention does not include a transmitter address, a receiver address, or duration information; which may be specifically implemented in two manners:

Manner 1 of generating the downlink MPDU: When the MPDU is formed at a MAC layer, that is, the MAC header domain of the MPDU does not include the transmitter address, the receiver address, or the duration information; in this case, the MAC header domain of the MPDU carried on the data domain of the PPDU does not include the transmitter address, the receiver address, or the duration information.

Manner 2 of generating the downlink MPDU: When the MPDU is formed at a MAC layer, the MPDU is the same as that in the prior art, that is, the MAC header domain of the MPDU includes the transmitter address, the receiver address, and the duration information; when the PPDU is formed at a PHY layer, the transmitter address, the receiver address, and the duration information in the MAC header domain of the MPDU are removed, and then the MPDU whose MAC header domain does not include the transmitter address, the receiver address, or the duration information is put in the data domain of the PPDU.

To make the objectives, technical solutions, and beneficial effects of the present invention more comprehensible, the following further describes the present invention in detail with reference to the accompanying drawings and embodiments. It should be understood that the specific embodiments described herein are merely used to explain the present invention but are not intended to limit the present invention.

The PPDU provided in this embodiment of the present invention may be applied to the IEEE 802.11ax protocol; however, the method and the apparatus that are provided in the embodiments of the present invention are not limited to the PPDU structure provided in this embodiment of the present invention.

Based on the system architecture in FIG. 1, an embodiment of the present invention provides a wireless local area network communications apparatus, where the wireless local area network communications apparatus may be a component such as a chip, and is used to transmit data in a wireless local area network. The communications apparatus is disposed in an AP. The wireless local area network communications apparatus may also be an AP, for example, a wireless access apparatus, a bridge, or a hotpot apparatus. The wireless local area network communications apparatus may access a server or a communications network.

Figure 7:
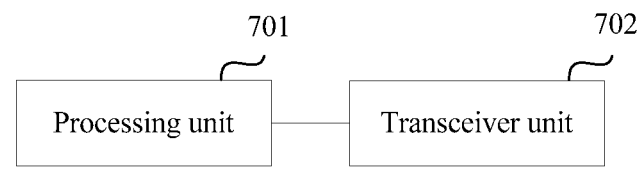
FIG. 7 is a schematic structural diagram of a wireless local area network communications apparatus according to an embodiment of the present invention.

As shown in FIG. 7, the wireless local area network communications apparatus may include:

a processing unit 701, configured to generate a PPDU of a wireless local area network, where the PPDU includes at least a PLCP header domain and a data domain, where the PLCP header domain includes a preamble and a control domain, and the control domain carries at least an identifier of the AP, an identifier of at least one STA, and duration information; and a transceiver unit 702, configured to send the generated PPDU.

The PPDU may be generated by a PHY layer entity, and an MPDU may be generated by a MAC layer entity.

For a purpose of reducing redundant information, a MAC header domain of a downlink MPDU carried on the data domain of the PPDU does not include a transmitter address, a receiver address, or duration information, which may be implemented in the foregoing two manners, and details are as follows:

Manner 1 of generating the downlink MPDU: The data domain of the PPDU generated by the processing unit 701 carries a downlink MPDU whose MAC header domain does not include a transmitter address, a receiver address, or duration information.

Specifically, when the MPDU is formed at a MAC layer, the MPDU is the same as that in the prior art, that is, the MAC header domain of the MPDU includes the transmitter address, the receiver address, and the duration information; when the PPDU is formed at a PHY layer, the transmitter address, the receiver address, and the duration information in the MAC header domain of the MPDU are removed, and then the MPDU whose MAC header domain does not include the transmitter address, the receiver address, or the duration information is put in the data domain of the PPDU.

Manner 2 of generating the downlink MPDU: The data domain of the PPDU generated by the processing unit 701 carries a downlink Medium Access Control protocol data unit MPDU, where a MAC header domain of the downlink MPDU does not include a transmitter address, a receiver address, or duration information.

Specifically, when the downlink MPDU is formed at a MAC layer, that is, the MAC header domain of the MPDU does not include the transmitter address, the receiver address, or the duration information; in this case, the MAC header domain of the MPDU carried on the data domain of the PPDU does not include the transmitter address, the receiver address, or the duration information.

Preferably, the data domain of the PPDU further carries uplink data information, and an uplink MPDU sent by a STA is received in the data domain according to resource indication information in the PPDU. The uplink MPDU may be generated in two manners, which are as follows:

Manner 1 of generating the uplink MPDU: The transceiver unit 702 receives an uplink PPDU sent by a STA, where a data domain of the uplink PPDU carries an uplink MPDU whose MAC header domain does not include a transmitter address, a receiver address, or duration information.

Specifically, when the MPDU is formed at a MAC layer, the MPDU is the same as that in the prior art, that is, the MAC header domain of the MPDU includes the transmitter address, the receiver address, and the duration information; when the PPDU is formed at a PHY layer, the transmitter address, the receiver address, and the duration information in the MAC header domain of the MPDU are removed, and then the MPDU whose MAC header domain does not include the transmitter address, the receiver address, or the duration information is put in the data domain of the PPDU.

Manner 2 of generating the uplink MPDU: The transceiver unit 702 receives an uplink PPDU sent by a STA, where a data domain of the uplink PPDU carries an uplink MPDU, where a MAC header domain of the uplink MPDU does not include a transmitter address, a receiver address, or duration information.

Specifically, when the MPDU is formed at a MAC layer, that is, the MAC header domain of the MPDU does not include the transmitter address, the receiver address, or the duration information; in this case, an uplink MPDU whose MAC header domain does not include the transmitter address, the receiver address, or the duration information is sent.

Preferably, the MAC header domain of the uplink MPDU or the downlink MPDU carried in the data domain includes at least a frame control field, where the frame control field is used to indicate a type of the MPDU.

Preferably, when the type of the MPDU indicated by the frame control field is a management frame or a data frame, the MAC header domain further includes at least an address 3 field and a sequence control field.

Preferably, when the type of the MPDU indicated by the frame control field is a quality of service (QoS) data frame, the MAC header domain further includes at least a QoS control field.

In specific implementation, the transceiver unit 702 is further configured to transmit the data domain by using an OFDMA technology, where the MAC header domain of the uplink MPDU or the downlink MPDU carried in the data domain further includes an OFDMA control field.

It can be learned that the header domain of the MPDU does not include a transmitter address, a receiver address, or duration information, which alleviates information redundancy in a data transmission process, and improves transmission efficiency.

Preferably, the MAC header domain of the uplink MPDU or the downlink MPDU further includes at least a frame control field, where the frame control field includes: an indicator bit of a protocol version, an indicator bit of a type of a frame, or an indicator bit of a subtype of a frame, and values of the foregoing three indicator bits are newly added values.

Preferably, the processing unit 701 is specifically configured to generate N consecutive PPDUs in an OFDMA transmission opportunity (TXOP), where for an $i^{th}$ frame in the N consecutive PPDUs, a time length value indicated by the duration information of the control domain of the PLCP header domain is total duration from the beginning of transmission of the $i^{th}$ frame to the end of transmission of an $N^{th}$ frame, and a value range of i is [1,N].

With the foregoing settings, a STA may keep silent in a process of transmitting N consecutive PPDUs, and does not send data, thereby reducing channel interference.

In conclusion, in this embodiment of the present invention, a control domain of a PLCP header domain in a PPDU carries identifier information of an AP, duration information, and an identifier of at least one STA, so that a STA may obtain the identifier information of the AP, the duration information, and the identifier of at least one STA by parsing only the control domain of the PLCP header domain. Therefore, the STA may determine whether the control domain of the PPDU includes an identifier of the STA and a wildcard STA identifier according to an identifier of the AP and the identifier of at least one STA; and further, if the STA determines that the control domain of the PPDU does not include the identifier of the STA or the wildcard STA identifier, the STA configures an NAV according to the duration information. In this process, only the control domain of the PPDU is parsed, thereby improving data transmission efficiency.

Based on the same conception, an embodiment of the present invention provides a wireless local area network communications apparatus used for transmitting data in a wireless local area network. The communications apparatus is disposed in a STA, and may be a wireless sensor, a wireless communications terminal, or a mobile terminal, such as a mobile phone (also referred to as a "cellular" phone) supporting a Wi-Fi communication function or a computer with a wireless communication function. For example, the communications apparatus may be a portable, pocket-sized, handheld, computer built-in, wearable, or in-vehicle wireless communications apparatus that supports the Wi-Fi communication function. A STA changes communications data, such as voice or data, with a radio access network.

Figure 8:
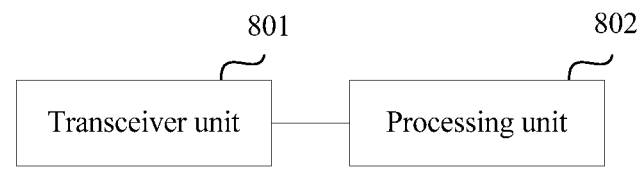
FIG. 8 is a schematic structural diagram of a wireless local area network communications apparatus according to an embodiment of the present invention.

As shown in FIG. 8, the wireless local area network communications apparatus may include:

a transceiver unit 801, configured to receive a PPDU of a wireless local area network sent by an AP, where the PPDU includes at least a PLCP header domain and a data domain, where the PLCP header domain includes a preamble and a control domain, and the control domain carries at least identifier information of the AP, an identifier of at least one STA, and duration information; and a processing unit 802, configured to obtain, by means of parsing, the identifier information of the AP, the identifier of at least one STA, and the duration information in the control domain of the PPDU.

The PPDU may be generated by a PHY layer entity, and an MPDU may be generated by a MAC layer entity.

For a purpose of reducing redundant information, in this embodiment of the present invention, a MAC header domain of a downlink MPDU carried on the data domain of the received PPDU does not include a transmitter address, a receiver address, or duration information, which may be implemented in the foregoing two manners, and details are as follows:

Manner 1 of generating the downlink MPDU: The data domain of the received PPDU carries a downlink MPDU whose MAC header domain does not include a transmitter address, a receiver address, or duration information.

Specifically, when the MPDU is formed at a MAC layer, the MPDU is the same as that in the prior art, that is, the MAC header domain of the MPDU includes the transmitter address, the receiver address, and the duration information; when the PPDU is formed at a PHY layer, the transmitter address, the receiver address, and the duration information in the MAC header domain of the MPDU are removed, and then the MPDU whose MAC header domain does not include the transmitter address, the receiver address, or the duration information is put in the data domain of the PPDU. The processing unit obtains the transmitter address and the receiver address in the MAC header domain of the downlink MPDU according to an identifier of the AP and an identifier of a STA in the control domain of the received PPDU.

Manner 2 of generating the downlink MPDU: The data domain of the received PPDU carries a downlink Medium Access Control protocol data unit MPDU, where a MAC header domain of the downlink MPDU does not include a transmitter address, a receiver address, or duration information.

Specifically, when the downlink MPDU is formed at a MAC layer, that is, the MAC header domain of the MPDU does not include the transmitter address, the receiver address, or the duration information; in this case, the MAC header domain of the MPDU carried on the data domain of the PPDU does not include the transmitter address, the receiver address, or the duration information. The processing unit obtains the transmitter address and the receiver address of the downlink MPDU according to an identifier of the AP and an identifier of a STA in the control domain of the received PPDU.

In specific implementation, the processing unit is further configured to: when it is determined that the identifier that is obtained by means of parsing and that is of the at least one STA in the PPDU does not include a wildcard identifier of a STA in which the communications apparatus is located, configure, according to the duration information obtained by means of parsing, an NAV of the STA in which the communications apparatus is located. The at least one STA includes a STA associated with the AP in the PPDU, and a wildcard STA. The identifier of the at least one STA is located in resource indication information.

If the resource indication information does not include resource information configured for the STA, and does not include wildcard resource indication information, a STA for which no resource indication information resource is configured configures an NAV of the STA according to the duration information, where the wildcard resource indication information includes resource indication information of a group of STAs or all STAs. Preferably, a wildcard identifier may be used in an HE-SIG 2 of the control domain for indicating the wildcard resource indication information.

In specific implementation, if the STA determines, according to the identifier of the AP, that the STA is not a STA associated with the AP, the STA determines whether the resource indication information includes wildcard resource indication information configured for all the STAs, and if the wildcard resource indication information is not included, the STA configures an NAV of the STA according to the duration information.

If the STA determines, according to the identifier of the AP, that the STA is a STA associated with the AP, the STA determines, according to the identifier of the AP and resource indication information, whether the resource indication information includes resource indication information configured for the STA. If the resource indication information does not include the resource indication information configured for the STA, and when it is further determined that the resource indication information does not include wildcard resource indication information, the STA for which no resource indication information is configured configures an NAV of the STA according to the duration information, where the wildcard indication information includes resource indication information of a group of STAs or all STAs, so as to ensure that no data is sent within a time length of a duration message, thereby reducing channel interference.

When the STA is associated with the AP, and the resource indication information indicates that the STA receives downlink data on a specified resource, the STA receives, on the specified resource, data in a downlink data domain, and parses the received data.

Preferably, when the data domain of the PPDU further carries uplink data information, the STA sends an uplink MPDU. The uplink MPDU may be generated in two manners, which are as follows:

Manner 1 of generating the uplink MPDU: The processing unit generates an uplink PPDU, where a data domain of the uplink PPDU carries an uplink MPDU whose MAC header domain does not include a transmitter address, a receiver address, or duration information; a transceiver unit sends the uplink PPDU.

Specifically, when the MPDU is formed at a MAC layer, the MPDU is the same as that in the prior art, that is, the MAC header domain of the MPDU includes the transmitter address, the receiver address, and the duration information; when the PPDU is formed at a PHY layer, the transmitter address, the receiver address, and the duration information in the MAC header domain of the MPDU are removed, and then the MPDU whose MAC header domain does not include the transmitter address, the receiver address, or the duration information is put in the data domain of the PPDU.

Further, the tailored uplink MPDU sent by the STA may be further differentiated in a scrambling manner, and scramble code used may be initialized by using an identifier of the STA and/or the identifier of the AP. The AP receives the MPDU sent by the STA in a specified time-frequency location in the resource indication information, and performs descrambling on this section of data before parsing the MPDU. Scramble code used is the same as that on a STA side.

For example, if the STA is associated with the AP, and the resource indication information indicates that the STA sends uplink data on a specified resource, the STA removes the receiver address (MAC address of the AP), the duration information, the transmitter address (MAC address of the STA) in the MAC header domain of the uplink MPDU from the MAC header domain of the uplink MPDU, and sends, in the data domain of the PPDU according to the resource indication information, to the AP, an uplink MPDU whose transmitter address, duration information, and receiver address are removed. When the STA sends the uplink MPDU, the STA sends, on the specified resource, the uplink MPDU according to resource indication information carried in the downlink PPDU; accordingly, the AP receives, in the data domain, the uplink MPDU according to the resource indication information.

Manner 2 of generating the uplink MPDU: The processing unit generates an uplink PPDU, where a data domain of the uplink PPDU carries an uplink MPDU, where a MAC header domain of the uplink MPDU does not include a transmitter address, a receiver address, or duration information.

Specifically, when the uplink MPDU is formed at a MAC layer, that is, the MAC header domain of the MPDU does not include the transmitter address, the receiver address, or the duration information; in this case, an uplink MPDU whose MAC header domain does not include the transmitter address, the receiver address, or the duration information is sent.

Further, for a purpose of reducing redundant information, when the STA sends uplink data, data information in an attached PLCP header domain does not need to include the identifier information of the AP or the duration information, and includes only some data used for channel estimation and correlation detection.

According to different types of MPDUs or different transmission technologies used, information included in the MAC header domain of the uplink MPDU or the downlink MPDU in this embodiment of the present invention is also different.

Figure 13A:
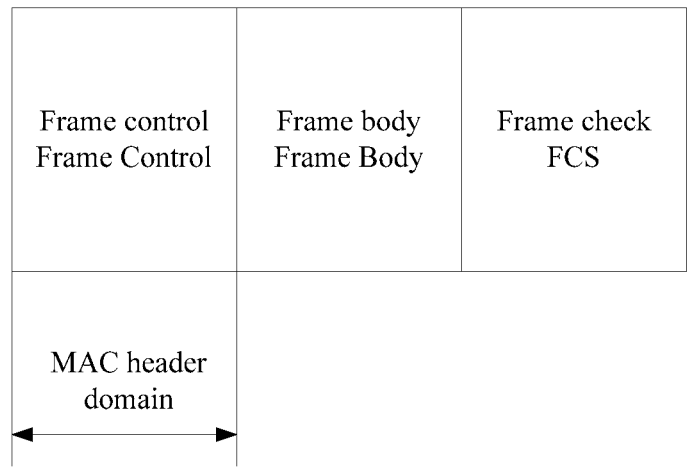
FIG. 13a is a schematic diagram of a frame structure of an MPDU in a data transmission method according to an embodiment of the present invention.

Specifically, the MAC header domain of either the uplink MPDU or the downlink MPDU includes at least a frame control field, where the frame control field is used to indicate a type of the MPDU, as shown in FIG. 13*a*.

Figure 13B:
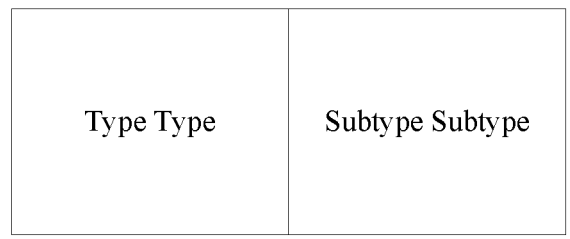
FIG. 13b is a schematic diagram of a structure of some frames in a frame control field of an MPDU in a data transmission method according to an embodiment of the present invention.
Figure 13C:
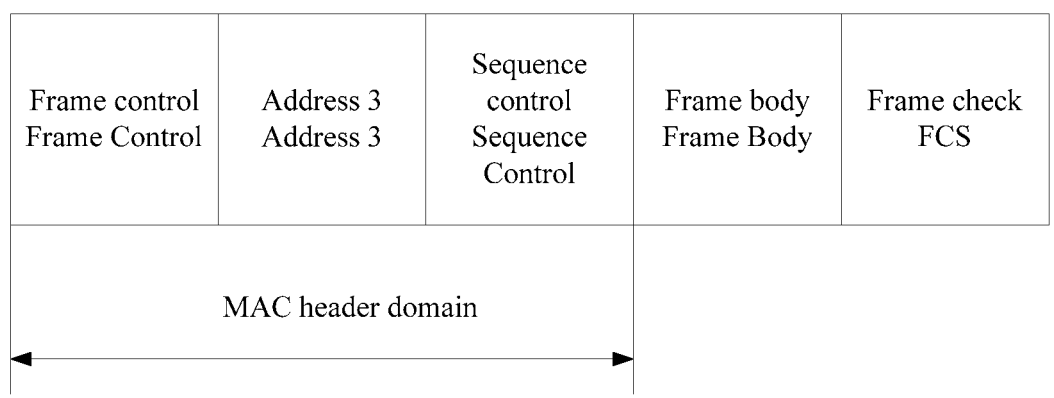
FIG. 13c is a schematic diagram of a frame structure of an MPDU in a data transmission method according to an embodiment of the present invention.

When the type of the MPDU indicated by the frame control field is a management frame or a data frame, the MAC header domain may further include at least an address 3 field and a sequence control field, as shown in FIG. 13*c*.

Figure 13D:
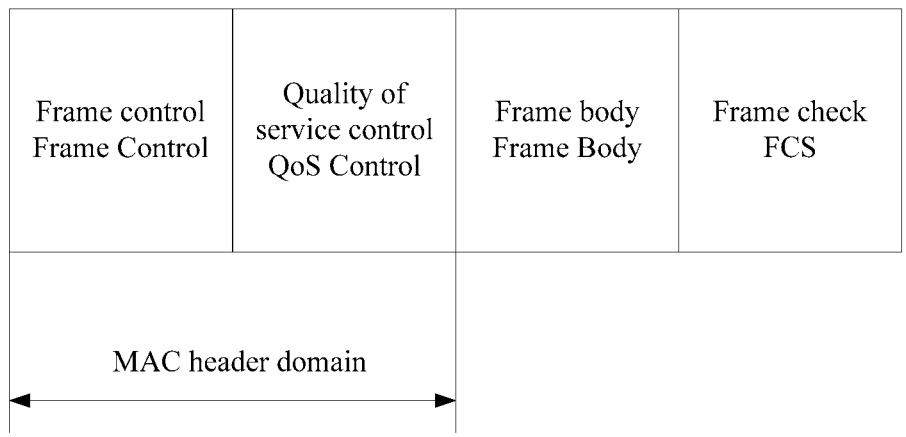
FIG. 13d is a schematic diagram of a frame structure of an MPDU in a data transmission method according to an embodiment of the present invention.

When the type of the MPDU indicated by the frame control field is a QoS data frame, the MAC header domain may further include at least a QoS control field, as shown in FIG. 13*d*.

Figure 13E:
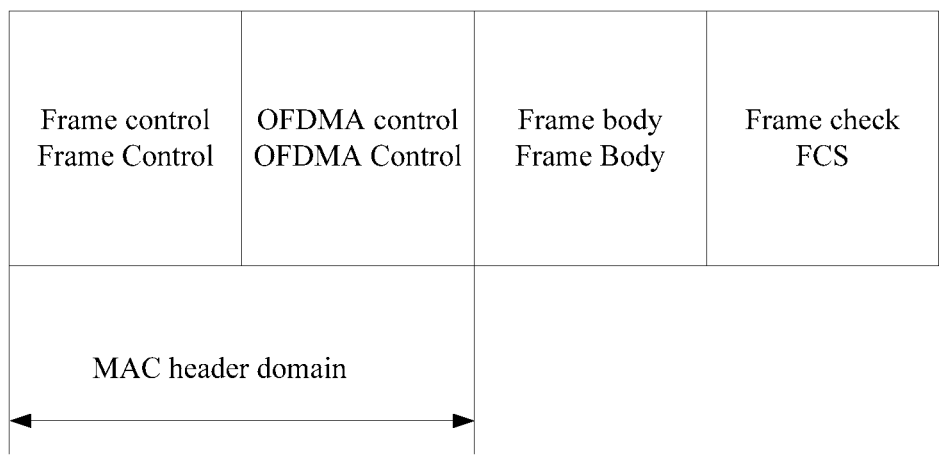
FIG. 13e is a schematic diagram of a frame structure of an MPDU in a data transmission method according to an embodiment of the present invention.

The data domain of the generated PPDU is sent by using an orthogonal frequency division multiple access OFDMA technology, where the MAC header domain of the uplink MPDU or the downlink MPDU carried in the data domain further includes an OFDMA control field, as shown in FIG. 13*e*.

It can be learned that when the STA sends uplink data, redundant data is reduced, and transmission efficiency is improved.

In conclusion, in this embodiment of the present invention, a control domain of a PLCP header domain in a PPDU carries identifier information of an AP, duration information, and an identifier of at least one STA, so that a STA may obtain the identifier information of the AP, the duration information, and the identifier of at least one STA by parsing only the control domain of the PLCP header domain. Therefore, the STA may determine whether the control domain of the PPDU includes an identifier of the STA and a wildcard STA identifier according to an identifier of the AP and the identifier of at least one STA; and further, if the STA determines that the control domain of the PPDU does not include the identifier of the STA or the wildcard STA identifier, the STA configures an NAV according to the duration information. In this process, only the control domain of the PPDU is parsed, thereby improving data transmission efficiency. The wildcard STA identifier includes identifiers of a group of STAs or all STAs.

Based on the same conception, an embodiment of the present invention provides a wireless local area network communications apparatus, where the wireless local area network communications apparatus may be a component such as a chip, and is used to transmit data in a wireless local area network. The communications apparatus is disposed in an AP. The wireless local area network communications apparatus may also be an AP, for example, a wireless access apparatus, a bridge, or a hotpot apparatus. The wireless local area network communications apparatus may access a server or a communications network.

Figure 9:
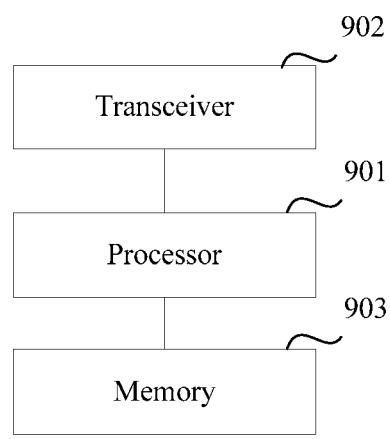
FIG. 9 is a schematic structural diagram of a wireless local area network communications apparatus according to an embodiment of the present invention.

As shown in FIG. 9, the wireless local area network communications apparatus includes a processor 901, a transceiver 902, and a memory 903.

The processor 901 is configured to generate a PPDU of a wireless local area network, where the PPDU includes at least a PLCP header domain and a data domain, where the PLCP header domain includes a preamble and a control domain, and the control domain carries at least an identifier of the AP, an identifier of at least one STA, and duration information.

The transceiver 902 is configured to send the generated PPDU.

The memory 903 is configured to store an MPDU and the PPDU. The memory 903 may also store code used by the processor 901 to execute the foregoing process.

The PPDU may be generated by a PHY layer entity, and the MPDU may be generated by a MAC layer entity.

For a purpose of reducing redundant information, a MAC header domain of a downlink MPDU carried on the data domain of the PPDU does not include a transmitter address, a receiver address, or duration information, which may be implemented in the foregoing two manners, and details are as follows:

Manner 1 of generating the downlink MPDU: The data domain of the PPDU generated by the processor 901 carries a downlink MPDU whose MAC header domain does not include a transmitter address, a receiver address, or duration information.

Specifically, when the MPDU is formed at a MAC layer, the MPDU is the same as that in the prior art, that is, the MAC header domain of the MPDU includes the transmitter address, the receiver address, and the duration information; when the PPDU is formed at a PHY layer, the transmitter address, the receiver address, and the duration information in the MAC header domain of the MPDU are removed, and then the MPDU whose MAC header domain does not include the transmitter address, the receiver address, or the duration information is put in the data domain of the PPDU.

Manner 2 of generating the downlink MPDU: The data domain of the PPDU generated by the processor 901 carries a downlink MPDU, where a MAC header domain of the downlink MPDU does not include a transmitter address, a receiver address, or duration information.

Specifically, when the downlink MPDU is formed at a MAC layer, that is, the MAC header domain of the MPDU does not include the transmitter address, the receiver address, or the duration information; in this case, the MAC header domain of the MPDU carried on the data domain of the PPDU does not include the transmitter address, the receiver address, or the duration information.

Preferably, the data domain of the PPDU further carries uplink data information, and an uplink MPDU sent by a STA is received in the data domain according to resource indication information in the PPDU. The uplink MPDU may be generated in two manners, which are as follows:

Manner 1 of generating the uplink MPDU: The transceiver 902 receives an uplink PPDU sent by a STA, where a data domain of the uplink PPDU carries an uplink MPDU whose MAC header domain does not include a transmitter address, a receiver address, or duration information.

Specifically, when the MPDU is formed at a MAC layer, the MPDU is the same as that in the prior art, that is, the MAC header domain of the MPDU includes the transmitter address, the receiver address, and the duration information; when the PPDU is formed at a PHY layer, the transmitter address, the receiver address, and the duration information in the MAC header domain of the MPDU are removed, and then the MPDU whose MAC header domain does not include the transmitter address, the receiver address, or the duration information is put in the data domain of the PPDU.

Manner 2 of generating the uplink MPDU: The transceiver 902 receives an uplink PPDU sent by a STA, where a data domain of the uplink PPDU carries an uplink MPDU, where a MAC header domain of the uplink MPDU does not include a transmitter address, a receiver address, or duration information.

Specifically, when the uplink MPDU is formed at a MAC layer, that is, the MAC header domain of the MPDU does not include the transmitter address, the receiver address, or the duration information; in this case, an uplink MPDU whose MAC header domain does not include the transmitter address, the receiver address, or the duration information is sent.

In specific implementation, the transceiver 902 is further configured to transmit the data domain by using an OFDMA technology, where the MAC header domain of the uplink MPDU or the downlink MPDU carried in the data domain further includes an OFDMA control field.

Preferably, the MAC header domain of the uplink MPDU or the downlink MPDU carried in the data domain includes at least a frame control field, where the frame control field is used to indicate a type of the MPDU.

Preferably, when the type of the MPDU indicated by the frame control field is a management frame or a data frame, the MAC header domain further includes at least an address 3 field and a sequence control field.

Preferably, when the type of the MPDU indicated by the frame control field is a quality of service QoS data frame, the MAC header domain further includes at least a QoS control field.

Preferably, the data domain of the generated PPDU is sent by using an orthogonal frequency division multiple access OFDMA technology, where the MAC header domain of the uplink MPDU or the downlink MPDU carried in the data domain further includes an OFDMA control field.

It can be learned that the header domain of the MPDU does not include a transmitter address, a receiver address, or duration information, which alleviates information redundancy in a data transmission process, and improves transmission efficiency.

Preferably, the MAC header domain of the uplink MPDU or the downlink MPDU further includes at least a frame control field, where the frame control field includes: an indicator bit of a protocol version, an indicator bit of a type of a frame, or an indicator bit of a subtype of a frame, and values of the foregoing three indicator bits are newly added values.

Preferably, the processor 901 is specifically configured to generate N consecutive PPDUs in an OFDMA transmission opportunity (English: Transmission Opportunity, TXOP for short), where for an $i^{th}$ frame in the N consecutive PPDUs, a time length value indicated by the duration information of the control domain of the PLCP header domain is total duration from the beginning of transmission of the $i^{th}$ frame to the end of transmission of an $N^{th}$ frame, and a value range of i is [1, N].

With the foregoing settings, a STA may keep silent in a process of transmitting N consecutive PPDUs, and does not send data, thereby reducing channel interference.

In conclusion, in this embodiment of the present invention, a control domain of a PLCP header domain in a PPDU carries identifier information of an AP, duration information, and an identifier of at least one STA, so that a STA may obtain the identifier information of the AP, the duration information, and the identifier of at least one STA by parsing only the control domain of the PLCP header domain. Therefore, the STA may determine whether the control domain of the PPDU includes an identifier of the STA and a wildcard STA identifier according to an identifier of the AP and the identifier of at least one STA; and further, if the STA determines that the control domain of the PPDU does not include the identifier of the STA or the wildcard STA identifier, the STA configures an NAV according to the duration information. In this process, only the control domain of the PPDU is parsed, thereby improving data transmission efficiency.

Based on the same conception, an embodiment of the present invention provides a wireless local area network communications apparatus used for transmitting data in a wireless local area network. A STA apparatus may be a wireless sensor, a wireless communications terminal, or a mobile terminal, for example, a mobile phone (or referred to as a "cellular" phone) supporting a Wi-Fi communication function or a computer with a wireless communication function. For example, the STA apparatus may be a portable, pocket-sized, handheld, computer built-in, wearable, or in-vehicle wireless communications apparatus that supports the Wi-Fi communication function. The STA apparatus changes communications data, such as voice or data, with a radio access network.

Figure 10:
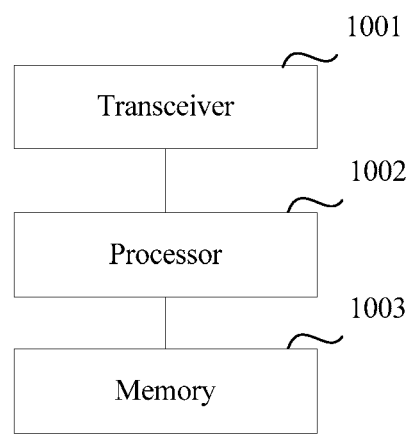
FIG. 10 is a schematic structural diagram of a wireless local area network communications apparatus according to an embodiment of the present invention.

As shown in FIG. 10, the wireless local area network communications apparatus includes a transceiver 1001, a processor 1002, and a memory 1003.

The transceiver 1001 is configured to receive a PPDU of a wireless local area network sent by an AP, where the PPDU includes at least a PLCP header domain and a data domain, where the PLCP header domain includes a preamble and a control domain, and the control domain carries at least identifier information of the AP, an identifier of at least one STA, and duration information.

The processor 1002 is configured to obtain, by means of parsing, the identifier information of the AP, the identifier of at least one STA, and the duration information in the control domain of the PPDU.

The memory 1003 is configured to store an MPDU and the PPDU. The memory 1003 may also store code used by the processor 1002 to execute the foregoing process.

The PPDU may be generated by a PHY layer entity, and the MPDU may be generated by a MAC layer entity.

For a purpose of reducing redundant information, in this embodiment of the present invention, a MAC header domain of a downlink MPDU carried on the data domain of the received PPDU does not include a transmitter address, a receiver address, or duration information, which may be implemented in the foregoing two manners, and details are as follows:

Manner 1 of generating the downlink MPDU: The data domain of the received PPDU carries a downlink MPDU whose MAC header domain does not include a transmitter address, a receiver address, or duration information.

Specifically, when the MPDU is formed at a MAC layer, the MPDU is the same as that in the prior art, that is, the MAC header domain of the MPDU includes the transmitter address, the receiver address, and the duration information; when the PPDU is formed at a PHY layer, the transmitter address, the receiver address, and the duration information in the MAC header domain of the MPDU are removed, and then the MPDU whose MAC header domain does not include the transmitter address, the receiver address, or the duration information is put in the data domain of the PPDU. The processing unit obtains the transmitter address and the receiver address in the MAC header domain of the downlink MPDU according to an identifier of the AP and an identifier of a STA in the control domain of the received PPDU.

Manner 2 of generating the downlink MPDU: The data domain of the received PPDU carries a downlink Medium Access Control protocol data unit MPDU, where a MAC header domain of the downlink MPDU does not include a transmitter address, a receiver address, or duration information.

Specifically, when the downlink MPDU is formed at a MAC layer, that is, the MAC header domain of the MPDU does not include the transmitter address, the receiver address, or the duration information; in this case, the MAC header domain of the MPDU carried on the data domain of the PPDU does not include the transmitter address, the receiver address, or the duration information. The processing unit obtains the transmitter address and the receiver address of the downlink MPDU according to an identifier of the AP and an identifier of a STA in the control domain of the received PPDU.

In specific implementation, the processing unit is further configured to: when it is determined that the identifier that is obtained by means of parsing and that is of the at least one STA in the PPDU does not include a wildcard identifier of a STA in which the communications apparatus is located, configure, according to the duration information obtained by means of parsing, an NAV of the STA in which the communications apparatus is located. The at least one STA includes a STA associated with the AP in the PPDU, and a wildcard STA. The identifier of the at least one STA is located in resource indication information.

If the resource indication information does not include resource information configured for the STA, and does not include wildcard resource indication information, a STA for which no resource indication information resource is configured configures an NAV of the STA according to the duration information, where the wildcard resource indication information includes resource indication information of a group of STAs or all STAs. Preferably, a wildcard identifier may be used in an HE-SIG 2 of the control domain for indicating the wildcard resource indication information.

In specific implementation, if the STA determines, according to the identifier of the AP, that the STA is not a STA associated with the AP, the STA determines whether the resource indication information includes wildcard resource indication information configured for all the STAs, and if the wildcard resource indication information is not included, the STA configures an NAV of the STA according to the duration information.

If the STA determines, according to the identifier of the AP, that the STA is a STA associated with the AP, the STA determines, according to the identifier of the AP and the resource indication information, whether the resource indication information includes resource indication information configured for the STA. If the resource indication information does not include the resource indication information configured for the STA, and when it is further determined that the resource indication information does not include the wildcard resource indication information, the STA for which no resource indication information is configured configures an NAV of the STA according to the duration information, where the wildcard indication information includes resource indication information of a group of STAs or all STAs, so as to ensure that no data is sent within a time length of a duration message, thereby reducing channel interference.

When the STA is associated with the AP, and the resource indication information indicates that the STA receives downlink data on a specified resource, the STA receives, on the specified resource, data in a downlink data domain, and parses the received data.

Preferably, when the data domain of the PPDU further carries uplink data information, the STA sends an uplink MPDU. The uplink MPDU may be generated in two manners, which are as follows:

Manner 1 of generating the uplink MPDU: The processing unit generates an uplink PPDU, where a data domain of the uplink PPDU carries an uplink MPDU whose MAC header domain does not include a transmitter address, a receiver address, or duration information; and a transceiver unit sends the uplink PPDU.

Specifically, when the MPDU is formed at a MAC layer, the MPDU is the same as that in the prior art, that is, the MAC header domain of the MPDU includes the transmitter address, the receiver address, and the duration information; when the PPDU is formed at a PHY layer, the transmitter address, the receiver address, and the duration information in the MAC header domain of the MPDU are removed, and then the MPDU whose MAC header domain does not include the transmitter address, the receiver address, or the duration information is put in the data domain of the PPDU.

Further, the tailored uplink MPDU sent by the STA may be further differentiated in a scrambling manner, and scramble code used may be initialized by using an identifier of the STA and/or an identifier of the AP. The AP receives the MPDU sent by the STA in a specified time-frequency location in the resource indication information, and performs descrambling on this section of data before parsing the MPDU. Scramble code used is the same as that on a STA side.

For example, if the STA is associated with the AP, and the resource indication information indicates that the STA sends uplink data on a specified resource, the STA removes the receiver address (English: MAC address of the AP), the duration information, and the transmitter address (English: MAC address of the STA) in the MAC header domain of the uplink MPDU from the MAC header domain of the uplink MPDU, and sends, in the data domain of the PPDU according to the resource indication information, to the AP, an uplink MPDU whose transmitter address, duration information, and receiver address are removed. When the STA sends the uplink MPDU, the STA sends, on the specified resource, the uplink MPDU according to resource indication information carried in the downlink PPDU; accordingly, the AP receives, in the data domain, the uplink MPDU according to the resource indication information.

Manner 2 of generating the uplink MPDU: The processing unit generates an uplink PPDU, where a data domain of the uplink PPDU carries an uplink MPDU, and a MAC header domain of the uplink MPDU does not include a transmitter address, a receiver address, or duration information.

Specifically, when the uplink MPDU is formed at a MAC layer, that is, the MAC header domain of the MPDU does not include the transmitter address, the receiver address, or the duration information; in this case, an uplink MPDU whose MAC header domain does not include the transmitter address, the receiver address, or the duration information is sent.

Further, for a purpose of reducing redundant information, when the STA sends uplink data, data information in an attached PLCP header domain does not need to include the identifier information of the AP or the duration information, and includes only some data used for channel estimation and correlation detection.

According to different types of MPDUs or different transmission technologies used, information included in the MAC header domain of the uplink MPDU or the downlink MPDU in this embodiment of the present invention is also different.

Specifically, the MAC header domain of either the uplink MPDU or the downlink MPDU includes at least a frame control field, where the frame control field is used to indicate a type of the MPDU, as shown in FIG. 13a.

When the type of the MPDU indicated by the frame control field is a management frame or a data frame, the MAC header domain may further include at least an address 3 field and a sequence control field, as shown in FIG. 13c.

When the type of the MPDU indicated by the frame control field is a QoS data frame, the MAC header domain may further include at least a QoS control field, as shown in FIG. 13d.

The data domain of the generated PPDU is sent by using an orthogonal frequency division multiple access OFDMA technology, where the MAC header domain of the uplink MPDU or the downlink MPDU carried in the data domain further includes an OFDMA control field, as shown in FIG. 13e.

It can be learned that when the STA sends uplink data, redundant data is reduced, and transmission efficiency is improved.

In conclusion, in this embodiment of the present invention, a control domain of a PLCP header domain in a PPDU carries identifier information of an AP, duration information, and an identifier of at least one STA, so that a STA may obtain the identifier information of the AP, the duration information, and the identifier of at least one STA by parsing only the control domain of the PLCP header domain. Therefore, the STA may determine whether the control domain of the PPDU includes an identifier of the STA and a wildcard STA identifier according to an identifier of the AP and the identifier of at least one STA; and further, if the STA determines that the control domain of the PPDU does not include the identifier of the STA or the wildcard STA identifier, the STA configures an NAV according to the duration information. In this process, only the control domain of the PPDU is parsed, thereby improving data transmission efficiency.

Figure 11:
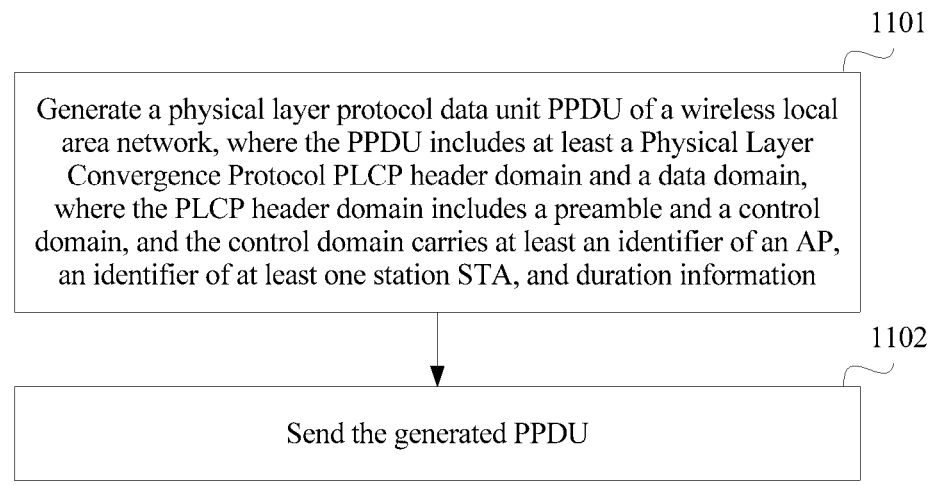
FIG. 11 shows a data transmission method according to an embodiment of the present invention.

Based on the same conception, an embodiment of the present invention provides a wireless local area network data transmission method that is applicable to an AP side, and a process may be implemented by using the apparatus shown in the foregoing FIG. 7 or FIG. 9. As shown in FIG. 11, which is a schematic diagram of a data transmission process according to an embodiment of the present invention, the process includes the following steps:

Step 1101: Generate a PPDU of a wireless local area network, where the PPDU includes at least a PLCP header domain and a data domain, where the PLCP header domain includes a preamble and a control domain, and the control domain carries at least an identifier of an AP, an identifier of at least one STA, and duration information.

Step 1102: Send the generated PPDU.

A format of an OFDMA PPDU constructed in step 1101 is shown in FIG. 6, which is described below in detail.

Preferably, in this embodiment of the present invention, the AP adds the preamble and the control domain to the PLCP header domain of the PPDU.

The preamble is an L-Pre used for performing time-frequency synchronization on the STA and the AP; the control domain includes an HE-SIG 1 and an HE-SIG 2.

For a purpose of reducing redundant information, a MAC header domain of a downlink MPDU carried on the data domain of the PPDU does not include a transmitter address, a receiver address, or duration information, which may be implemented in the foregoing two manners, and details are as follows:

Manner 1 of generating the downlink MPDU: The data domain of the generated PPDU carries a downlink MPDU whose MAC header domain does not include a transmitter address, a receiver address, or duration information.

Specifically, when the MPDU is formed at a MAC layer, the MPDU is the same as that in the prior art, that is, the MAC header domain of the MPDU includes the transmitter address, the receiver address, and the duration information; when the PPDU is formed at a PHY layer, the transmitter address, the receiver address, and the duration information in the MAC header domain of the MPDU are removed, and then the MPDU whose MAC header domain does not include the transmitter address, the receiver address, or the duration information is put in the data domain of the PPDU.

Manner 2 of generating the downlink MPDU: The data domain of the generated PPDU carries a downlink MPDU, where a MAC header domain of the downlink MPDU does not include a transmitter address, a receiver address, or duration information.

Specifically, when the downlink MPDU is formed at a MAC layer, that is, the MAC header domain of the MPDU does not include the transmitter address, the receiver address, or the duration information; in this case, the MAC header domain of the MPDU carried on the data domain of the PPDU does not include the transmitter address, the receiver address, or the duration information.

In specific implementation, identifier information of the AP and the duration information are added to the PLCP header domain, and the MAC header domain of the downlink MPDU does not include the transmitter address, the duration information, or the receiver address; where the transmitter address is an address 2 in the MAC header domain of the MPDU, and the receiver address is an address 1 in the MAC header domain of the MPDU.

In the method provided in this embodiment of the present invention, an AP sends, in a broadcast manner, a PPDU to all STAs within a coverage area of an AP network, including STAs associated or not associated with the AP. After parsing the preamble, the STA obtains identifier information of the AP and the duration information by sequentially parsing the control domain; the STA determines, according to the identifier information of the AP, identifier information of the STA, and resource indication information, that no resource indication information configured for the STA is included, that is, subsequent data of the PPDU does not include an MPDU belonging to the STA or an uplink transmission resource that is not scheduled by the STA, and does not include wildcard resource indication information. A STA for which no resource indication information is configured configures, according to the duration information, an NAV of the STA, where the wildcard resource indication information includes resource indication information of a group of STAs or all the STAs, so as to ensure that no data is sent within a time length of a duration message, thereby reducing channel interference.

It can be learned that the identifier information of the AP and the duration information are added to the PLCP header domain, so that a STA not associated with the AP may configure an NAV of the STA according to the duration information without parsing subsequent transmission data MPDU, thereby improving data transmission efficiency. In addition, the MPDU does not include the transmitter address or the duration information, which avoids repeated transmission of the identifier information of the AP and the duration information, alleviates information redundancy in a data transmission process, and improves transmission efficiency.

Specifically, the identifier information of the AP may be added to an HE-SIG 1 or an HE-SIG 2 of the control domain, and the duration information may be added to the HE-SIG 1 or the HE-SIG 2 of the control domain.

When the identifier information of the AP is parsed out by the STA, the STA determines whether the STA is associated with the AP; after the resource indication information is parsed out, the STA determines whether resource indication information of the STA exists, and if resource indication information configured for the STA is not included, a STA for which no resource indication information is configured configures an NAV of the STA according to the duration information.

Preferably, resource indication information that is still carried in the control domain is located in the HE-SIG 2 of the control domain. Specifically, the resource indication information includes: allocation information of uplink and downlink OFDMA time-frequency resource blocks, identifier information of the scheduled STA, transmission signaling corresponding to the STA associated with the scheduled AP, and some other transmission parameter configuration, such as a quantity of spatial flows.

The STA may learn, according to the resource indication information, whether subsequent data load includes data belonging to the STA, so as to determine whether to parse the MPDU. If the resource indication information indicates that the STA does not need to transmit data, the STA configures an NAV of the STA according to the duration information, and no data is sent within a period of time specified in the duration information, thereby reducing channel interference. If the resource indication information indicates that the STA needs to receive downlink data on a time-frequency resource, or needs to send uplink data on a time-frequency resource, the STA continues to parse the MPDU, and transmits data with the AP.

It can be learned that because the resource indication information includes the identifier information of the STA, the MPDU may not include a MAC address of the STA, thereby reducing redundant data in the MPDU, and improving transmission efficiency.

Specifically, a data domain following the HE-SIG 1 or the HE-SIG 2 further includes a training sequence used by the STA to perform channel estimation and coherent detection.

Preferably, the duration information is specifically configured to generate N consecutive PPDUs in an OFDMA TXOP, where for an $i^{th}$ frame in the N consecutive PPDUs, a time length value indicated by the duration information of the control domain of the PLCP header domain is total duration from the beginning of transmission of the $i^{th}$ frame to the end of transmission of an $N^{th}$ frame, and a value range of i is [1, N].

Figure 12:
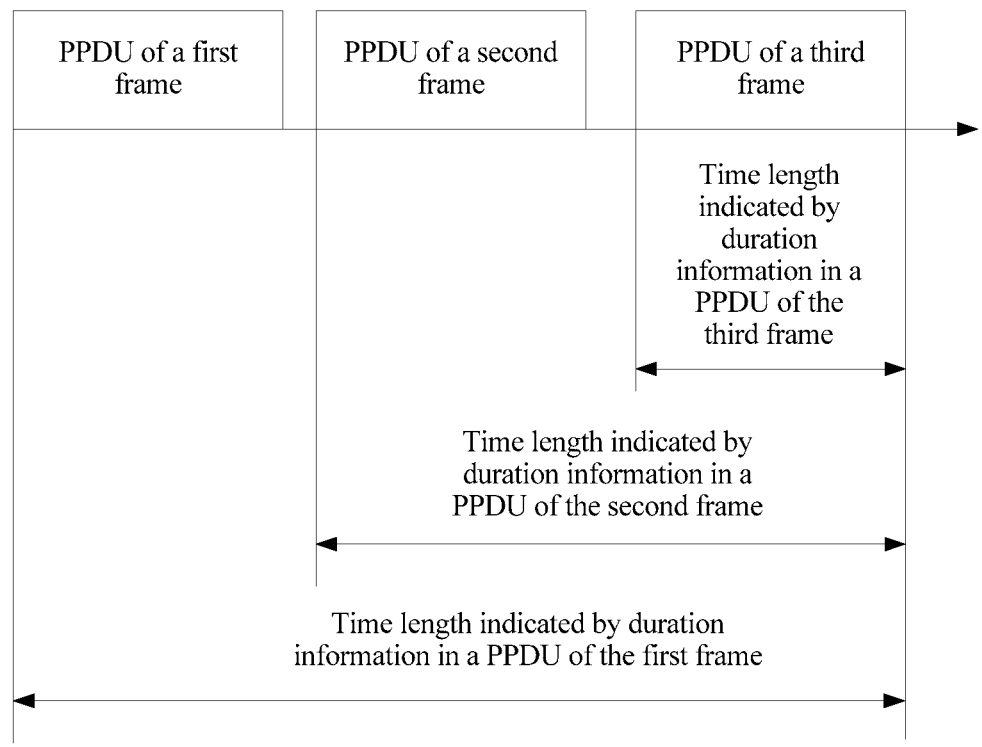
FIG. 12 is a schematic diagram of a time length specified by duration information in a data transmission method according to an embodiment of the present invention.

For example, as shown in FIG. 12, it is assumed that there are three consecutive OFDMA PPDUs in an OFDMA TXOP. A time length value indicated by duration information of a PPDU of the first frame is total duration from the beginning of transmission of the first frame to the end of transmission of the third frame, a time length value indicated by duration information of a PPDU of the second frame is total duration from the beginning of transmission of the second frame to the end of transmission of the third frame, and a time length value indicated by duration information of a PPDU of the third frame is total duration from the beginning of transmission of the third frame to the end of transmission of the third frame.

With the foregoing settings, a STA may keep silent in a process of transmitting N consecutive PPDUs, and does not send data, thereby reducing channel interference.

In specific implementation, the MAC header domain of the uplink MPDU or the downlink MPDU further includes at least a frame control field. The frame control field is used to indicate a type of the MPDU, as shown in FIG. 13a. Types of an MPDU include a control frame, a management frame, and a data frame. A control frame in a WLAN is, for example, request to send (English: request to send, RTS for short), clear to send (English: clear to send, CTS for short), or acknowledgement (English: Acknowledgement, ACK for short).

Preferably, when the type of the MPDU indicated by the frame control field is a management frame or a data frame, the MAC header domain further includes at least an address 3 field and a sequence control field, as shown in FIG. 13c. For content carried in the address 3 field, refer to an existing 802.11 protocol.

Specifically, the management frame or the data frame has many subtype frame structures. When the type of the MPDU indicated by the frame control field is either the management frame or the data frame, or any one of subtype frames in the management frame or the data frame, the MAC header domain further includes at least the address 3 field and the sequence control field.

Preferably, when the type of the MPDU indicated by the frame control field is a QoS data frame, the MAC header domain further includes at least a QoS control field, as shown in FIG. 13d.

In specific implementation, the data domain of the generated PPDU is sent by using an orthogonal frequency division multiple access OFDMA technology, where the MAC header domain of the uplink MPDU or the downlink MPDU carried in the data domain further includes an OFDMA control field, as shown in FIG. 13e.

For some frames whose transmission efficiency is not high but require integrity of addressing, for example, a beacon frame, or a probe response frame, a complete MPDU is still added to the data domain of the PPDU in OFDMA transmission.

In specific implementation, the MAC header domain of the uplink MPDU or the downlink MPDU further includes at least a frame control field, where the frame control field includes: an indicator bit of a protocol version, an indicator bit of a type of a frame, or an indicator bit of a subtype of a frame, and values of the foregoing three indicator bits are newly added values.

Specifically, in the method of this embodiment of the present invention, the indicator bit of a protocol version in the frame control field of the MAC header domain may be set to a value different from a default value. The existing 802.11 protocol specifies that the default value of the indicator bit of the protocol version in the frame control field of the MPDU is "00"; in this case, a structure of the MPDU is shown in FIG. 4. When data carried in the MPDU is reduced, the indicator bit of a protocol version in the frame control field of the MAC header domain may be set to a value different from the default value, for example, "01", "10", or "11"; in this case, a structure of the MPDU is shown in FIG. 13a, FIG. 13b, FIG. 13c, and FIG. 13d.

Specifically, in the method of this embodiment of the present invention, the indicator bit for indicating a type of a frame in a frame control field of the MAC header domain may further be set to a newly added value, or the indicator bit for indicating a subtype of a frame in a frame control field of the MAC header domain may be set to a newly added value. That is, some values of indicator bits are newly added for indicating the control frame, the management frame, or the data frame, and some values of indicator bits are newly added for indicating a subtype of each frame type.

For example, FIG. 13b is a data domain structure in a frame control domain for indicating a type of a frame and a subtype of a frame, that is, a type of a sub-frame.

When an indicator bit of a frame type is "00", it indicates that the MPDU is a management frame, and common values for indicating a subtype frame of a management frame are "0000~1110"; in this case, in the method of this embodiment of the present invention, an indicator bit of a type of a sub-frame may be set to "1111".

When an indicator bit of a frame type is "01", it indicates that the MPDU is a control frame, and common values for indicating a subtype frame of a control frame are "0111~1111"; in this case, in the method of this embodiment of the present invention, an indicator bit of a type of a sub-frame may be set to a value in a range of "0000~0110".

When the MPDU is a data frame, because all subtypes under an indicator bit "10" of a frame type are used, in the method of this embodiment of the present invention, the data frame may be indicated by setting an indicator bit of a frame type as "11", and setting a subtype to a meaningful value.

In step 1102, the AP may send, in a broadcast manner, the preamble to all STAs within a coverage area of an AP network, and all the STAs perform time-frequency synchronization with the AP.

The AP may send, in a broadcast manner, the control domain to all STAs within a coverage area of an AP network, and all the STAs parse data in the control domain to obtain identifier information of the AP, duration information, and resource indication information configured for the STA.

Preferably, the data domain of the PPDU further carries uplink data information, and an uplink MPDU sent by a STA is received in the data domain according to resource indication information in the PPDU. The uplink MPDU may be generated in two manners, which are as follows:

Manner 1 of generating the uplink MPDU: receiving an uplink PPDU sent by a STA, where a data domain of the uplink PPDU carries an uplink MPDU whose MAC header domain does not include a transmitter address, a receiver address, or duration information.

Specifically, when the MPDU is formed at a MAC layer, the MPDU is the same as that in the prior art, that is, the MAC header domain of the MPDU includes the transmitter address, the receiver address, and the duration information; when the PPDU is formed at a PHY layer, the transmitter address, the receiver address, and the duration information in the MAC header domain of the MPDU are removed, and then the MPDU whose MAC header domain does not include the transmitter address, the receiver address, or the duration information is put in the data domain of the PPDU.

Manner 2 of generating the uplink MPDU: receiving an uplink PPDU sent by a STA, where a data domain of the uplink PPDU carries an uplink MPDU, where a MAC header domain of the uplink MPDU does not include a transmitter address, a receiver address, or duration information.

Specifically, when the uplink MPDU is formed at a MAC layer, that is, the MAC header domain of the MPDU does not include the transmitter address, the receiver address, or the duration information; in this case, an uplink MPDU whose MAC header domain does not include the transmitter address, the receiver address, or the duration information is sent.

If the STA is associated with the AP, and the resource indication information indicates that the STA sends uplink data on a specified resource, the STA sends the uplink MPDU, that is, the STA sends, in the data domain of the PPDU according to the resource indication information, the uplink MPDU that does not include the transmitter address, the duration information, or the receiver address to the AP, and the STA sends, on the specified resource, the uplink MPDU; the AP receives, in the data domain according to the resource indication information, the uplink MPDU sent by the STA.

Further, when the STA sends uplink data, data information in an attached PLCP header domain may not include identifier information of the AP and duration information, and may include only some data used for channel estimation and coherent detection, thereby reducing redundant data and improving transmission efficiency.

In conclusion, in this embodiment of the present invention, a control domain of a PLCP header domain in a PPDU carries identifier information of an AP, duration information, and an identifier of at least one STA, so that a STA may obtain the identifier information of the AP, the duration information, and the identifier of at least one STA by parsing only the control domain of the PLCP header domain. Therefore, the STA may determine whether the control domain of the PPDU includes an identifier of the STA and a wildcard STA identifier according to an identifier of the AP and the identifier of at least one STA; and further, if the STA determines that the control domain of the PPDU does not include the identifier of the STA or the wildcard STA identifier, the STA configures an NAV according to the duration information. In this process, only the control domain of the PPDU is parsed, thereby improving data transmission efficiency.

Figure 14:
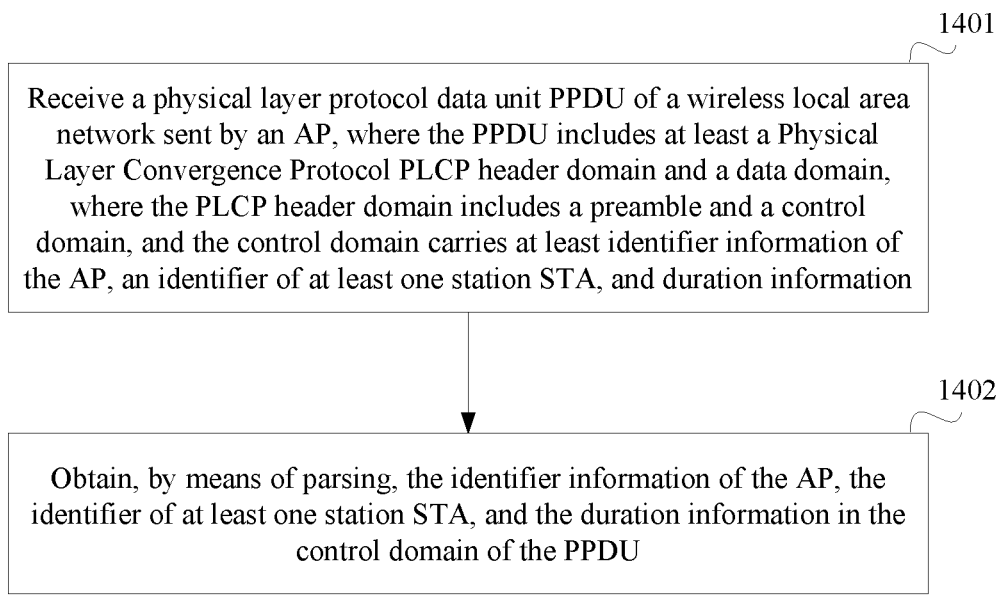
FIG. 14 shows a data transmission method according to an embodiment of the present invention.
Figure 15:
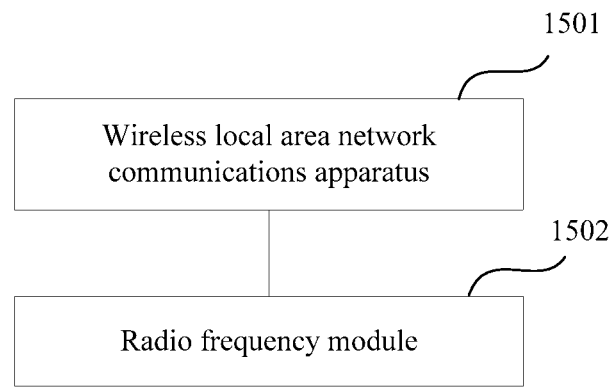
FIG. 15 is a schematic structural diagram of a wireless local area network communications apparatus according to an embodiment of the present invention.
Figure 16:
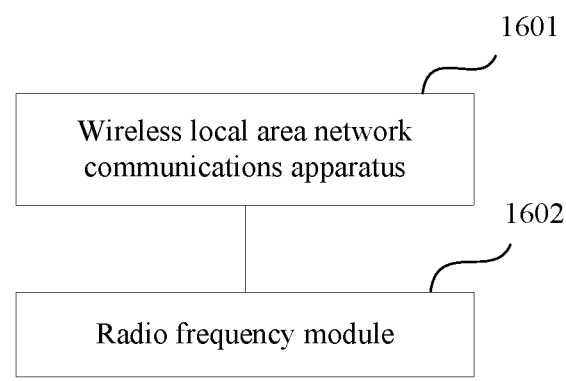
FIG. 16 is a schematic structural diagram of a wireless local area network communications apparatus according to an embodiment of the present invention.

Based on the same conception, an embodiment of the present invention provides a process of a data transmission method. The method is applicable to a STA side, and the process may be implemented by using the apparatus shown in FIG. 8 or FIG. 10. As shown in FIG. 14, which is a schematic diagram of a data transmission process according to an embodiment of the present invention, the process includes the following steps:

Step 1401: Receive a PPDU of a wireless local area network sent by an AP, where the PPDU includes at least a PLCP header domain and a data domain, where the PLCP header domain includes a preamble and a control domain, and the control domain carries at least identifier information of the AP, an identifier of at least one STA, and duration information.

Step 1402: Obtain, by means of parsing, the identifier information of the AP, the identifier of at least one station STA, and the duration information in the control domain of the PPDU. In specific implementation, resource indication information configured for the STA is parsed, and data transmission with the AP is performed by using the data domain of the PPDU according to the resource indication information.

A format of an OFDMA PPDU constructed in step 1401 and step 1402 is shown in FIG. 6, which is described below in detail.

In specific implementation, when it is determined that the identifier that is obtained by means of parsing and that is of the at least one STA in the PPDU does not include an identifier of the STA, and does not include a wildcard STA identifier, an NAV of the STA is configured according to the duration information obtained by means of parsing. As mentioned above, the AP may send, in a broadcast manner, the PPDU to all STAs within a coverage area of an AP network. After parsing the preamble of the PPDU, the STA may obtain by sequentially parsing the control domain, the identifier information of the AP, the duration information and the resource indication information, and then the STA for which no resource indication information is configured configures an NAV of the STA according to the duration information, so as to ensure that no data is sent within a time length of a duration message, thereby reducing channel interference.

It can be learned that if the identifier information of the AP and the duration information are added to the PLCP header domain, a STA for which no resource indication information is configured may configure an NAV of the STA according to the duration information without parsing subsequent transmission data MPDU, thereby improving data transmission efficiency.

As mentioned above, in the PLCP header domain of the PPDU, the identifier information of the AP may be added to an HE-SIG 1 or an HE-SIG 2 of the control domain, and the duration information may be added to the HE-SIG 1 or the HE-SIG 2 of the control domain.

When the identifier information of the AP is parsed out by the STA, the STA determines whether the STA is associated with the AP; after the resource indication information is parsed out, the STA determines whether resource indication information of the STA exists, and if resource indication information configured for the STA is not included, a STA for which no resource indication information is configured configures an NAV of the STA according to the duration information.

Preferably, resource indication information that is still carried in the control domain is located in the HE-SIG 2 of the control domain. Specifically, the resource indication information includes: allocation information of uplink and downlink OFDMA time-frequency resource blocks, identifier information of the scheduled STA, transmission signaling corresponding to the STA associated with the scheduled AP, and some other transmission parameter configuration, such as a quantity of spatial flows.

The STA may learn, according to the resource indication information, whether subsequent data load includes data belonging to the STA, so as to determine whether to parse the MPDU. If the resource indication information indicates that the STA does not need to transmit data, the STA configures an NAV of the STA according to the duration information, and no data is sent within a period of time specified in the duration information, thereby reducing channel interference. If the resource indication information indicates that the STA needs to receive downlink data on a time-frequency resource, or needs to send uplink data on a time-frequency resource, the STA continues to parse the MPDU, and transmits data with the AP.

If the STA is not associated with the AP, and the resource indication information does not include wildcard resource indication information, the STA configures an NAV of the STA according to the duration information, where the wildcard resource information includes resource indication information of a group of STAs or all STAs, so as to ensure that no data is sent within a time length of a duration message, thereby reducing channel interference.

If the STA is associated with the AP, but the resource indication information does not include resource information configured for the STA, and when it is further determined that the resource indication information does not include wildcard resource indication information, a STA for which no resource indication information resource is configured configures an NAV of the STA according to the duration information, where the wildcard resource indication information includes resource indication information of a group of STAs or all the STAs, so as to ensure that no data is sent within a time length of a duration message, thereby reducing channel interference.

If the STA is associated with the AP, and the resource indication information indicates that the STA receives downlink data on a specified resource, the STA receives, on the specified resource, data in a downlink data domain, and parses the received data.

For a purpose of reducing redundant information, in this embodiment of the present invention, a MAC header domain of a downlink MPDU carried on the data domain of the received PPDU does not include a transmitter address, a receiver address, or duration information, which may be implemented in the foregoing two manners, and details are as follows:

Manner 1 of generating the downlink MPDU: The data domain of the received PPDU carries a downlink Medium Access Control protocol data unit MPDU whose MAC header domain does not include a transmitter address, a receiver address, or duration information; the transmitter address and the receiver address in the MAC header domain of the downlink MPDU are obtained according to an identifier of the AP and an identifier of the STA in the control domain of the received PPDU.

Specifically, when the MPDU is formed at a MAC layer, the MPDU is the same as that in the prior art, that is, the MAC header domain of the MPDU includes the transmitter address, the receiver address, and the duration information; when the PPDU is formed at a PHY layer, the transmitter address, the receiver address, and the duration information in the MAC header domain of the MPDU are removed, and then the MPDU whose MAC header domain does not include the transmitter address, the receiver address, or the duration information is put in the data domain of the PPDU.

Manner 2 of generating the downlink MPDU: The data domain of the received MPDU carries a downlink MPDU, where a MAC header domain of the downlink MPDU does not include a transmitter address, a receiver address, or duration information; the transmitter address and the receiver address of the downlink MPDU are obtained according to an identifier of the AP and an identifier of the STA in the control domain of the received PPDU.

Specifically, when the downlink MPDU is formed at a MAC layer, that is, the MAC header domain of the MPDU does not include the transmitter address, the receiver address, or the duration information; in this case, the MAC header domain of the MPDU carried on the data domain of the PPDU does not include the transmitter address, the receiver address, or the duration information.

If the STA is associated with the AP, and the resource indication information indicates that the STA sends uplink data on a specified resource, the STA sends, in the data domain of the PPDU, an uplink MPDU to the AP according to the resource indication information; the AP receives, in the data domain according to the resource indication information, the uplink MPDU sent by the STA.

Preferably, when the data domain of the PPDU further carries uplink data information, the STA sends an uplink MPDU. The uplink MPDU may be generated in two manners, which are as follows:

Manner 1 of generating the uplink MPDU: generating an uplink PPDU, where a data domain of the uplink PPDU carries an uplink MPDU whose MAC header domain does not include a transmitter address, a receiver address, or duration information; and the transceiver unit is further configured to send the uplink PPDU.

Specifically, when the MPDU is formed at a MAC layer, the MPDU is the same as that in the prior art, that is, the MAC header domain of the MPDU includes the transmitter address, the receiver address, and the duration information; when the PPDU is formed at a PHY layer, the transmitter address, the receiver address, and the duration information in the MAC header domain of the MPDU are removed, and then the MPDU whose MAC header domain does not include the transmitter address, the receiver address, or the duration information is put in the data domain of the PPDU.

Further, the tailored uplink MPDU sent by the STA may be further differentiated in a scrambling manner, and scramble code used may be initialized by using an identifier of the STA and/or an identifier of the AP. The AP receives the MPDU sent by the STA in a specified time-frequency location in the resource indication information, and performs descrambling on this section of data before parsing the MPDU. Scramble code used is the same as that on a STA side.

Manner 2 of generating the uplink MPDU: generating an uplink PPDU, where a data domain of the uplink PPDU carries an uplink MPDU, where a MAC header domain of the uplink MPDU does not include a transmitter address, a receiver address, or duration information.

Specifically, when the uplink MPDU is formed at a MAC layer, that is, the MAC header domain of the MPDU does not include the transmitter address, the receiver address, or the duration information; in this case, an uplink MPDU whose MAC header domain does not include the transmitter address, the receiver address, or the duration information is sent.

In this embodiment of the present invention, the MPDU does not include the transmitter address, the duration information, or the receiver address, which reduces data carried on the MPDU, reduces redundant data, and improves transmission efficiency.

Specifically, the MAC header domain of either the uplink MPDU or the downlink MPDU includes at least a frame control field, where the frame control field is used to indicate a type of the uplink MPDU, as shown in FIG. 13a.

When the type of the uplink MPDU indicated by the frame control field is a management frame or a data frame, the MAC header domain further includes at least an address 3 field and a sequence control field, as shown in FIG. 13c.

When the type of the uplink MPDU indicated by the frame control field is a QoS data frame, the MAC header domain further includes at least a QoS control field, as shown in FIG. 13d.

When the data domain of the generated PPDU is sent by using an orthogonal frequency division multiple access OFDMA technology, the MAC header domain of the uplink MPDU or the downlink MPDU carried in the data domain further includes an OFDMA control field, as shown in FIG. 13e.

Specifically, when the STA sends uplink data, data information in an attached PLCP header domain does not need to include identifier information of the AP or the duration information that is removed from the MAC header domain of the uplink MPDU, and includes only some data used for channel estimation and coherent detection.

Preferably, the MAC header domain of the uplink MPDU or the downlink MPDU further includes at least a frame control field, where the frame control field includes: an indicator bit of a protocol version, an indicator bit of a type of a frame, or an indicator bit of a subtype of a frame, and values of the foregoing three indicator bits are newly added values.

Specifically, in the method of this embodiment of the present invention, the indicator bit of a protocol version in a frame control field of the MAC header domain may be set to a value different from a default value. The existing 802.11 protocol specifies that the default value of the indicator bit of the protocol version in the frame control field of the MPDU is "00"; in this case, a structure of the MPDU is shown in FIG. 4. When data carried in the MPDU is reduced, the indicator bit of the protocol version in the frame control field of the MAC header domain may be set to a value different from the default value, for example, "01", "10", or "11"; in this case, a structure of the MPDU is shown in FIG. 13a, FIG. 13b, FIG. 13c, and FIG. 13d.

Preferably, in the method of this embodiment of the present invention, the indicator bit for indicating a type of a frame in a frame control field of the MAC header domain may further be set to a newly added value, or the indicator bit for indicating a subtype of a frame in a frame control field of the MAC header domain may be set to a newly added value. That is, some values of indicator bits are newly added for indicating the control frame, the management frame, or the data frame, and some values of indicator bits are newly added for indicating a subtype of each frame type.

For example, FIG. 13b is a data domain structure in a frame control domain for indicating a type of a frame and a subtype of a frame, that is, a type of a sub-frame.

When an indicator bit of a frame type is "00", it indicates that the MPDU is a management frame, and common values for indicating a subtype frame of a management frame are "0000~1110"; in this case, in the method of this embodiment of the present invention, an indicator bit of a type of a sub-frame may be set to "1111".

When an indicator bit of a frame type is "01", it indicates that the MPDU is a control frame, and common values for indicating a subtype frame of a control frame are "0111~1111"; in this case, in the method of this embodiment of the present invention, an indicator bit of a type of a sub-frame may be set to a value in a range of "0000~0110".

When the MPDU is a data frame, because all subtypes under an indicator bit "10" of a frame type are used; in the method of this embodiment of the present invention, the data frame may be indicated by setting an indicator bit of a frame type as "11", and setting a subtype to a meaningful value.

It can be learned that when the STA sends uplink data, some information in the MPDU is removed, thereby reducing redundant data and improving transmission efficiency.

It can be learned from the foregoing content that, in this embodiment of the present invention, a control domain of a PLCP header domain in a PPDU constructed by an AP carries identifier information of the AP, duration information, and an identifier of at least one STA, so that a STA may obtain the identifier information of the AP, the duration information, and the identifier of at least one STA by parsing only the control domain of the PLCP header domain. Therefore, the STA may determine whether the control domain of the PPDU includes an identifier of the STA and a wildcard STA identifier according to an identifier of the AP and the identifier of at least one STA; and further, if the STA determines that the control domain of the PPDU does not include the identifier of the STA or the wildcard STA identifier, the STA configures an NAV according to the duration information. In this process, only the control domain of the PPDU is parsed, thereby improving data transmission efficiency. The wildcard STA identifier includes identifiers of a group of STAs or all STAs.

Based on the same conception, an embodiment of the present invention provides an AP, including a wireless local area network communications apparatus 1501 and a radio frequency module 1502.

The wireless local area network communications apparatus 1501 may be the wireless local area network communications apparatus in the embodiment provided in FIG. 7 or FIG. 9, and details are not described herein.

The radio frequency module 1502 is configured to: receive a PPDU sent by a transceiver unit or a transceiver in the wireless local area network communications apparatus 1501, modulate the PPDU into a radio frequency signal, and then send the radio frequency signal; and receive a radio frequency signal sent by a STA, demodulate the radio frequency signal, and then send the demodulated radio frequency signal to the transceiver unit or the transceiver in the wireless local area network communications apparatus 1501.

Based on the same conception, an embodiment of the present invention provides a STA, including: a wireless local area network communications apparatus 1601 and a radio frequency module 1602.

The wireless local area network communications apparatus 1601 may be the wireless local area network communications apparatus in the embodiment provided in FIG. 8 or FIG. 10, and details are not described herein.

The radio frequency module 1602 is configured to: receive a radio frequency signal sent by an AP, demodulate the radio frequency signal into a PPDU, and then send the PPDU to a transceiver unit; and receive a PPDU sent by a transceiver unit or transceiver in the wireless local area network communications apparatus 1601, modulate the PPDU into a radio frequency signal, and then send the radio frequency signal.

A person skilled in the art should understand that the embodiments of the present invention may be provided as a method or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the apparatus, and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing apparatus to generate a machine, so that the instructions executed by a computer or a processor of any other programmable data processing apparatus generate an apparatus for implementing a specific function in one or more processes in the flowcharts and/or in one or more blocks in the block diagrams.

These computer program instructions may also be stored in a computer readable memory that can instruct the computer or any other programmable data processing apparatus to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing apparatus, so that a series of operations and steps are performed on the computer or the another programmable apparatus, thereby generating computer-implemented processing. Therefore, the instructions executed on the computer or the another programmable apparatus provide steps for implementing a specific function in one or more processes in the flowcharts and/or in one or more blocks in the block diagrams.

Although some exemplary embodiments of the present invention have been described, persons skilled in the art can make changes and modifications to these embodiments once they learn the basic inventive concept. Therefore, the following claims are intended to be construed as to cover the exemplary embodiments and all changes and modifications falling within the scope of the present invention.

Obviously, a person skilled in the art can make various modifications and variations to the present invention without departing from and scope of the present invention. The present invention is intended to cover these modifications and variations provided that they fall within the scope of protection defined by the following claims and their equivalent technologies.

For example, during a process of generating (or processing) an uplink MPDU in the foregoing implementation manners, with reference to an actual situation, it is possible that only some information in a MAC header domain is compressed, for example, one or a combination of a transmitter address, a receiver address, or duration information.

Specifically, when a PLCP header domain of an uplink PPDU sent by a station includes a receiver address (such as an ID of an AP) and duration, processing may be performed in the manner 1 or 2 of generating the uplink MPDU mentioned above. Certainly, alternatively, the PLCP header domain of the uplink PPDU may not include the receiver address and/or the duration; in this case, manner 3 of generating of the uplink MPDU may be used:

generating an uplink PPDU, where a PLCP header domain of the uplink PPDU does not include one or any combination of a transmitter address, a receiver address, or duration, and a data domain of the uplink PPDU carries an uplink MPDU whose MAC header domain does not include at least information about the transmitter address; and sending the uplink PPDU.

Specific Examples

Example 1a: If the PLCP header domain does not include the receiver address or the duration, the data domain of the uplink PPDU may carry an uplink MPDU that does not include the transmitter address.

Example 2a: If the PLCP header domain includes the receiver address but does not include the duration, the data domain of the uplink PPDU may carry an uplink MPDU that does not include information about the transmitter address or information about the receiver address.

Example 3a: If the PLCP header domain includes the duration but does not include the receiver address, the data domain of the uplink PPDU may carry an MPDU that does not include the transmitter address or the duration information.

Example 4a: If the PLCP header domain includes the transmitter address but does not include the receiver address or the duration, the data domain of the uplink PPDU may carry an uplink MPDU that does not include the transmitter address.

Example 5a: If the PLCP header domain includes the transmitter address and the receiver address but does not include the duration, the data domain of the uplink PPDU may carry an uplink MPDU that does not include information about the transmitter address or information about the receiver address.

Example 6a: If the PLCP header domain includes the transmitter address and the duration but does not include the receiver address, the data domain of the uplink PPDU may carry an uplink MPDU that does not include the transmitter address or the duration information.

Specifically, in Example 1, when an MPDU is formed at a MAC layer, the MPDU is the same as that in the prior art, that is, a MAC header domain of the MPDU includes the transmitter address; when a PPDU is formed at a PHY layer, the transmitter address in the MAC header domain of the MPDU is removed, and then the MPDU whose MAC header domain does not include the transmitter address is put in the data domain of the PPDU.

Further, the tailored uplink MPDU sent by the STA may be further differentiated in a scrambling manner, and scramble code used may be initialized by using an identifier of the STA and/or an identifier of an AP. The AP receives the MPDU sent by the STA in a specified time-frequency location in the resource indication information, and performs descrambling on this section of data before parsing the MPDU. Scramble code used is the same as that on a STA side.

For example, if the STA is associated with the AP, and the resource indication information indicates that the STA sends uplink data on a specified resource, the STA removes the transmitter address (MAC address of the STA) in the MAC header domain of the uplink MPDU from the MAC header domain of the uplink MPDU, and sends, in the data domain of the PPDU according to the resource indication information, to the AP, an uplink MPDU whose transmitter address is removed. When the STA sends the uplink MPDU, the STA sends the uplink MPDU on a specified resource according to resource indication information carried in the downlink PPDU; accordingly, the AP receives, in the data domain, the uplink MPDU according to the resource indication information.

The foregoing solution may also be applied to a data structure of the MAC header domain of the uplink MPDU mentioned above. That is, manner 4 of generating the uplink MPDU is as follows:

generating an uplink PPDU, where a PLCP header domain of the uplink PPDU does not include one or any combination of a transmitter address, a receiver address, or duration, and a data domain of the uplink PPDU carries an MPDU, where a MAC header domain of the uplink MPDU does not include at least information about the transmitter address.

Specific Examples

Example 1b: If the PLCP header domain does not include the receiver address or the duration, the data domain of the uplink PPDU may carry an uplink MPDU, where a MAC header domain of the uplink MPDU does not include the transmitter address.

Example 2b: If the PLCP header domain includes the receiver address but does not include the duration, the data domain of the uplink PPDU may carry an uplink MPDU, where a MAC header domain of the uplink MPDU does not include information about the transmitter address or information about the receiver address.

Example 3b: If the PLCP header domain includes the duration but does not include the receiver address, the data domain of the uplink PPDU may carry an uplink MPDU, where a MAC header domain of the uplink MPDU does not include the transmitter address or the duration information.

Example 4b: If the PLCP header domain includes the transmitter address but does not include the receiver address or the duration, the data domain of the uplink PPDU may carry an uplink MPDU, where a MAC header domain of the uplink MPDU does not include the transmitter address.

Example 5b: If the PLCP header domain includes the transmitter address and the receiver address but does not include the duration, the data domain of the uplink PPDU may carry an uplink MPDU, where a MAC header domain of the uplink MPDU does not include information about the transmitter address or information about the receiver address.

Example 6b: If the PLCP header domain includes the transmitter address and the duration but does not include the receiver address, the data domain of the uplink PPDU may carry an uplink MPDU, where a MAC header domain of the uplink MPDU does not include the transmitter address or the duration information.

Specifically, in Example 1b, when an uplink MPDU is formed at a MAC layer, that is, a MAC header domain of the MPDU does not include at least the transmitter address; in this case, an uplink MPDU whose MAC header domain does not include the transmitter address is sent.

The foregoing solution may be applied to the apparatus and method mentioned in the foregoing implementation manners; for example, the generation process is implemented by using a processing unit or a processor, and a sending and receiving processes are implemented by using a transceiver. A person skilled in the art may also understand that the uplink MPDU and the uplink PPDU are correspondingly received and processed on a receive side by an access point. The foregoing expanded implementation manners and details of the implementation manners mentioned above may be logically combined, and other expandable content is not described in this specification.

What is claimed is:

1. A wireless local area network communications apparatus, wherein the communications apparatus is disposed in an access point (AP), and comprises:
   a processor, configured to generate a physical layer protocol data unit (PPDU) of a wireless local area network, wherein the generated PPDU comprises a Physical Layer Convergence Protocol (PLCP) header domain and a data domain, wherein the PLCP header domain comprises a preamble and a control domain, and the control domain carries duration information, wherein the duration information is used for network allocation vector (NAV) setting and protecting transmission of one or more subsequent PPDUs after the generated PPDU in a transmission opportunity (TXOP), and a duration indicated by the duration information includes transmission time of the one or more subsequent PPDUs after the generated PPDU in the TXOP; and a transceiver, configured to send the generated PPDU wherein the data domain of the generated PPDU is transmitted by using an orthogonal frequency division multiple access (OFDMA) technology, wherein a medium access control (MAC) header domain of a downlink medium access control protocol data unit (MPDU) carried in the data domain further comprises an OFDMA control field.

2. The apparatus according to claim 1, wherein the processor is further configured to generate N consecutive PPDUs in the TXOP, wherein for an $i^{th}$ PPDU in the N consecutive PPDUs, a time length indicated by the duration information of the control domain of the PLCP header domain of the $i^{th}$ PPDU is total duration including transmission time of subsequent N-i PPDUs, and a value range of i is [1, N].

3. The apparatus according to claim 1, wherein the duration indicated by the duration information is within a duration of the TXOP.

4. The apparatus according to claim 1, wherein no data is sent by a non-target station (STA) within the duration indicated by the duration information.

5. The apparatus according to claim 1, wherein the duration information indicates remaining time after the generated PPDU in the TXOP.

6. A wireless local area network communications apparatus, wherein the communications apparatus is disposed in a station (STA), and comprises:
 a transceiver, configured to receive a physical layer protocol data unit (PPDU) of a wireless local area network from an access point (AP), wherein the PPDU comprises a Physical Layer Convergence Protocol (PLCP) header domain and a data domain, wherein the PLCP header domain comprises a preamble and a control domain, and the control domain carries duration information, wherein the duration information is used for network allocation vector (NAV) setting and protecting transmission of one or more subsequent PPDUs after the PPDU in a transmission opportunity (TXOP), and a duration indicated by the duration information includes transmission time of the one or more subsequent PPDUs after the PPDU in the TXOP; and
 a processor, configured to obtain, via parsing, the duration information in the control domain of the PPDU;
 wherein the data domain of the PPDU is received by using an orthogonal frequency division multiple access (OFDMA) technology, wherein a medium access control (MAC) header domain of a downlink medium access control protocol data unit (MPDU) carried in the data domain further comprises an OFDMA control field.

7. The apparatus according to claim 6, wherein the transceiver is further configured to receive N consecutive PPDUs in the TXOP, wherein for an $i^{th}$ PPDU in the N consecutive PPDUs, a time length indicated by the duration information of the control domain of the PLCP header domain of the $i^{th}$ PPDU is total duration including transmission time of subsequent N-i PPDUs, and a value range of i is [1, N].

8. The apparatus according to claim 6, wherein the duration indicated by the duration information is within a duration of the TXOP.

9. The apparatus according to claim 6, wherein no data is sent by a non-target STA within the duration indicated by the duration information.

10. The apparatus according to claim 6, wherein the duration information indicates remaining time after the PPDU in the TXOP.

11. A wireless local area network data transmission method, comprising:
 generating, by an access point (AP), a physical layer protocol data unit (PPDU) of a wireless local area network, wherein the generated PPDU comprises a Physical Layer Convergence Protocol (PLCP) header domain and a data domain, wherein the PLCP header domain comprises a preamble and a control domain, and the control domain carries duration information, wherein the duration information is used for network allocation vector (NAV) setting and protecting transmission of one or more subsequent PPDUs after the generated PPDU in a transmission opportunity (TXOP), and a duration indicated by the duration information includes transmission time of the one or more subsequent PPDUs after the generated PPDU in the TXOP; and
 sending, by the AP, the generated PPDU, wherein the data domain of the generated PPDU is transmitted by using an orthogonal frequency division multiple access (OFDMA) technology, wherein a medium access control (MAC) header domain of a downlink medium access control protocol data unit (MPDU) carried in the data domain further comprises an OFDMA control field.

12. The method according to claim 11, further comprising:
 generating, by the AP, N consecutive PPDUs in the TXOP, wherein for an $i^{th}$ PPDU in the N consecutive PPDUs, a time length indicated by the duration information of the control domain of the PLCP header domain of the $i^{th}$ PPDU is total duration including transmission time of subsequent N-i PPDUs, and a value range of i is [1, N].

13. The method according to claim 11, wherein the duration indicated by the duration information is within a duration of the TXOP.

14. The method according to claim 11, wherein no data is sent by a non-target station (STA) within the duration indicated by the duration information.

15. The method according to claim 11, wherein the duration information indicates remaining time after the generated PPDU in the TXOP.

16. A wireless local area network data transmission method, comprising:
 receiving, by a station (STA), a physical layer protocol data unit (PPDU) of a wireless local area network from an access point (AP), wherein the PPDU comprises a Physical Layer Convergence Protocol (PLCP) header domain and a data domain, wherein the PLCP header domain comprises a preamble and a control domain, and the control domain carries duration information, wherein the duration information is used for network allocation vector (NAV) setting and protecting transmission of one or more subsequent PPDUs after the PPDU in a transmission opportunity (TXOP), and a duration indicated by the duration information includes transmission time of the one or more subsequent PPDUs after the PPDU in the TXOP; and
 obtaining, via parsing, the duration information in the control domain of the PPDU;
 wherein the data domain of the PPDU is received by using an orthogonal frequency division multiple access (OFDMA) technology, wherein a medium access control (MAC) header domain of a downlink medium access control protocol data unit (MPDU) carried in the data domain further comprises an OFDMA control field.

17. The method according to claim 16, further comprising:
receiving, by the STA, N consecutive PPDUs in the TXOP, wherein for an $i^{th}$ PPDU in the N consecutive PPDUs, a time length indicated by the duration information of the control domain of the PLCP header domain of the $i^{th}$ PPDU is total duration including transmission time of subsequent N-i PPDUs, and a value range of i is [1, N].

18. The method according to claim 16, wherein the duration indicated by the duration information is within a duration of the TXOP.

19. The method according to claim 16, wherein no data is sent by a non-target STA within the duration indicated by the duration information.

20. The method according to claim 16, wherein the duration information indicates remaining time after the PPDU in the TXOP.

\* \* \* \* \*